United States Patent
Hesse et al.

(10) Patent No.: US 9,598,315 B2
(45) Date of Patent: Mar. 21, 2017

(54) HARDENING ACCELERATOR COMPOSITION

(71) Applicant: BASF SE, Ludwigshafen (DE)

(72) Inventors: Christoph Hesse, Ebersberg (DE); Luc Nicoleau, Ludwigshafen am Rhein (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/651,774

(22) PCT Filed: Jan. 27, 2014

(86) PCT No.: PCT/EP2014/051485
§ 371 (c)(1),
(2) Date: Jun. 12, 2015

(87) PCT Pub. No.: WO2014/114782
PCT Pub. Date: Jul. 31, 2014

(65) Prior Publication Data
US 2015/0299042 A1 Oct. 22, 2015

(30) Foreign Application Priority Data
Jan. 25, 2013 (EP) .................... 13152685

(51) Int. Cl.
| | |
|---|---|
| *C04B 28/02* | (2006.01) |
| *C04B 28/10* | (2006.01) |
| *C04B 22/10* | (2006.01) |
| *C04B 28/06* | (2006.01) |
| *C04B 28/14* | (2006.01) |
| *C04B 28/16* | (2006.01) |
| *C04B 40/00* | (2006.01) |
| *C04B 24/26* | (2006.01) |
| *C04B 24/32* | (2006.01) |
| *C04B 103/14* | (2006.01) |

(52) U.S. Cl.
CPC .......... *C04B 22/10* (2013.01); *C04B 24/2688* (2013.01); *C04B 24/32* (2013.01); *C04B 28/02* (2013.01); *C04B 28/06* (2013.01); *C04B 28/065* (2013.01); *C04B 28/14* (2013.01); *C04B 28/16* (2013.01); *C04B 40/0042* (2013.01); *C04B 2103/14* (2013.01); *Y02W 30/92* (2015.05); *Y02W 30/94* (2015.05)

(58) Field of Classification Search
CPC ................ C04B 28/02; C04B 28/10
See application file for complete search history.

(56) References Cited

U.S. PATENT DOCUMENTS

| | | |
|---|---|---|
| 6,187,841 B1 | 2/2001 | Tanaka et al. |
| 6,211,317 B1 | 4/2001 | Albrecht et al. |
| 6,376,581 B1 | 4/2002 | Tanaka et al. |
| 7,041,167 B2 | 5/2006 | Jiang |
| 7,842,766 B2 | 11/2010 | Kraus et al. |
| 7,910,640 B2 | 3/2011 | Wieland et al. |
| 8,653,186 B2 | 2/2014 | Nicoleau et al. |
| 2011/0203486 A1 | 8/2011 | Nicoleau et al. |
| 2012/0216724 A1 | 8/2012 | Nicoleau et al. |
| 2012/0220696 A1 | 8/2012 | Nicoleau et al. |
| 2013/0217808 A1 | 8/2013 | Sulser et al. |
| 2014/0066546 A1 | 3/2014 | Langlotz et al. |
| 2015/0148456 A1 | 5/2015 | Eissmann et al. |
| 2015/0152008 A1 | 6/2015 | Langlotz et al. |
| 2015/0197448 A1 | 7/2015 | Nicoleau et al. |
| 2015/0291474 A1 | 10/2015 | Nicoleau et al. |

FOREIGN PATENT DOCUMENTS

| | | | |
|---|---|---|---|
| DE | 10 2004 050 395 A1 | 4/2006 | |
| EP | 0 753 488 A2 | 1/1997 | |
| EP | 0 894 811 A1 | 2/1999 | |
| EP | 2 463 314 A1 | 6/2012 | |
| WO | 02/070425 A1 | 9/2002 | |
| WO | 2006/089759 A1 | 8/2006 | |
| WO | 2010/026155 A1 | 3/2010 | |
| WO | WO 2010/026155 A1 * | 3/2010 | ............. C04B 28/02 |
| WO | 2012/143206 A1 | 10/2012 | |
| WO | WO 2012/143205 | 10/2012 | |
| WO | WO 2012/143205 A1 * | 10/2012 | ............. C04B 28/02 |
| WO | 2012/160319 A1 | 11/2012 | |

OTHER PUBLICATIONS

Cölfen, Helmut "Analytical Ultracentrifugation of Nanoparticles", Polymer News, 29 (2004), pp. 101-116 [Abstract Only].
H. F. W. Taylor (1997): Cement Chemistry, 2. ed., p. 212 et seq.
Cölfen, Helmut "Analytical Ultracentrifugation of Nanoparticles", Encyclopedia of Nanoscience and Nanotechnology, vol. 1, (2004), pp. 67-88.
Cölfen, Helmut "Analytical Ultracentrifugation of Nanoparticles", Polymer News, 29 (2004), pp. 101-116.

* cited by examiner

*Primary Examiner* — Robert Harlan
(74) *Attorney, Agent, or Firm* — Oblon, McClelland, Maier & Neustadt, L.L.P.

(57) ABSTRACT

The invention relates to a process for the preparation of a hardening accelerator composition by reacting a calcium source selected from calcium hydroxide, calcium oxide with a water-soluble silicate compound in the presence of at least one water-soluble polymeric dispersing agent and the hardening accelerator composition obtainable by said process. The composition has a low content of anions and of alkali cations and is therefore broadly applicable in building material mixtures.

13 Claims, 1 Drawing Sheet

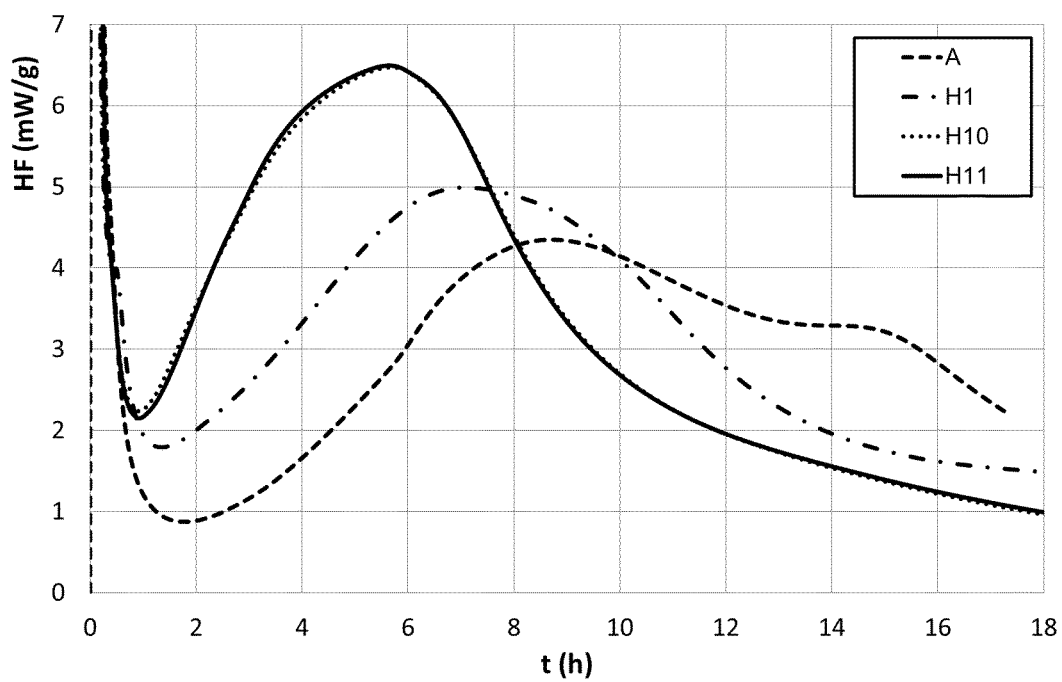

HARDENING ACCELERATOR COMPOSITION

This application is a §371 of International Application No. PCT/EP2014/051485 filed Jan. 27, 2014, and claims priority from European Patent Application No. 13152685.7 filed Jan. 25, 2013.

The present invention relates to a process for the preparation of a hardening accelerator composition, the hardening accelerator composition and the use of the hardening accelerator composition.

It is known that admixtures in the form of dispersants are often added to aqueous slurries of pulverulent inorganic or organic substances, such as clays, silicate powders, chalks, carbon blacks, powdered rocks and hydraulic binders, for improving their workability, i.e. kneadability, spreadability, sprayability, pumpability or flowability. Such admixtures are capable of breaking up solid agglomerates, dispersing the particles formed and in this way improving the fluidity. This effect is also utilised in a targeted manner in particular in the preparation of building material mixtures which contain hydraulic binders, such as cement, lime, gypsum, calcium sulphate hemihydrate (bassanite), anhydrous calcium sulphate (anhydrite), or latent hydraulic binders, such as fly ash, blast furnace slag or pozzolans.

In order to convert these building material mixtures based on said binders into a ready-to-use, workable form, as a rule substantially more mixing water is required than would be necessary for the subsequent hydration and hardening process. The proportion of cavities which are formed in the concrete body by the excess water which subsequently evaporates leads to significantly poorer mechanical strength and durability.

In order to reduce this excess proportion of water at a predetermined processing consistency and/or to improve the workability at a predetermined water/binder ratio, admixtures which are generally referred to as water-reducer compositions or plasticizers are used. In particular, copolymers which are prepared by free radical copolymerization of acid monomers with polyether macromonomers are used in practice as such compositions.

Furthermore, admixtures for building material mixtures comprising hydraulic binders typically also contain hardening accelerators which shorten the setting time of the hydraulic binder. According to WO 02/070425, calcium silicate hydrate in particular present in dispersed (finely or particularly finely dispersed) form, can be used as such a hardening accelerator. However, commercially available calcium silicate hydrate or corresponding calcium silicate hydrate dispersions may be regarded only as hardening accelerators which have little effect.

Another method for producing a hardening accelerator on the basis of C—S—H is described in WO 2010/026155 which discloses a process for the preparation of a hardening accelerator composition by reaction of a water-soluble calcium compound with a water-soluble silicate compound, the reaction of the water-soluble calcium compound with the water-soluble silicate compound being carried out in the presence of an aqueous solution which contains a water-soluble comb polymer suitable as a plasticizer for hydraulic binders. The water-soluble calcium compound is in particular calcium chloride or calcium nitrate. Numerous water-soluble silicate compounds, among them waterglass in the form of sodium metasilicate ($Na_2SiO_3$), may be used. In an other embodiment, calcium hydroxide is reacted with silicon dioxide under alkaline conditions.

The known hardening accelerators have disadvantages, in particular due to the high concentration of salts remaining in the product. Hardening accelerators on the basis of C—S—H which are prepared using said calcium compounds as a calcium source loose a part of their activity upon drying. The use of calcium chloride results in corrosive mixtures and the use of calcium nitrate together with organic compounds are critical from a safety aspect. Products on the basis of calcium acetate are hygroscopical whereas calcium sulfate may result in solubility problems. The presence of a high amount of alkali ions is disadvantageous from an environmental aspect.

For these disadvantages the known hardening accelerators can only be used under certain conditions. As water is disadvantageous for dry binders, in particular cement, the known hardening accelerator suspensions cannot be used for dry binders.

The object of the present invention is therefore to provide a hardening accelerator composition which is broadly applicable. A further object of the present invention is to provide a hardening accelerator composition which has a low content of anions, in particular chloride and nitrate, and a low content of alkali cations. A further object of the present invention is to provide a hardening accelerator composition which can be prepared in powder form so that it can be used for dry binders.

This object is achieved by a process for the preparation of a hardening accelerator composition on the basis of calcium silicate hydrate (C—S—H) by reacting a calcium source which is selected from calcium hydroxide and calcium oxide with a water-soluble silicate compound in the presence of at least one water-soluble polymeric dispersing agent which includes anionic and/or anionogenic groups and polyether side chains.

EMBODIMENTS OF THE INVENTION

1. A process for the preparation of a hardening accelerator composition by reacting a calcium source selected from calcium hydroxide and calcium oxide with a water-soluble silicate compound in the presence of at least one water-soluble polymeric dispersing agent which includes anionic and/or anionogenic groups and polyether side chains, wherein the water-soluble silicate compound is selected from an alkali metal silicate with the formula m $SiO_2 \cdot nM_2O$, wherein M is Li, Na, K or $NH_4$ or mixtures thereof, m and n are molar numbers and the ratio of m:n is from about 2.0 to about 4.
2. A process according to Embodiment 1, wherein the calcium source and the water-soluble silicate compound are added to an aqueous solution of the water-soluble polymeric dispersing agent.
3. A process according to Embodiment 1, wherein a solution or suspension of the calcium source and a solution of a water-soluble silicate compound are added to the aqueous solution of the water-soluble dispersing agent.
4. A process according to Embodiment 3, wherein the solution or suspension of the calcium source containing the water-soluble dispersing agent and the solution of the water-soluble silicate compound optionally containing the water-soluble dispersing agent are mixed or the solution/suspension of calcium source optionally containing the water-soluble dispersing agent and the solution of the water-soluble silicate compound containing the water-soluble dispersing agent are mixed.
5. A process according to Embodiment 3, wherein the aqueous solution containing the water-soluble dispersing agent and the calcium source are mixed with a solution of the water-soluble silicate compound or the aqueous solution containing the water-soluble dispersing agent and a water-soluble silicate compound is mixed with a solution or suspension of the calcium source.

6. A process according to any of Embodiments 2 or 5, the calcium source is used in solid form.

7. A process according to any of Embodiments 1 to 6, wherein the components are used in the following ratios:
   i) 0.01 to 75, preferably 0.01 to 51, most preferably 0.01 to 15% by weight of calcium hydroxide or calcium oxide,
   ii) 0.01 to 75, preferably 0.01 to 55, most preferably 0.01 to 10% by weight of the water-soluble silicate compound,
   iii) 0.001 to 60, preferably 0.1 to 30, most preferably 0.1 to 10% by weight of water-soluble dispersing agent,
   iv) 24 to 99, preferably 50 to 99, most preferably 70 to 99% by weight of water.

8. A process according to any of Embodiments 1 to 7, wherein the aqueous solution additionally contains dissolved aluminium and/or magnesium ions.

9. A process according to any of Embodiments 1 to 8, wherein the calcium hydroxide or calcium oxide is used together with a water-soluble calcium salt selected from calcium chloride, calcium nitrate, calcium formate, calcium acetate, calcium bicarbonate, calcium bromide, calcium carbonate, calcium citrate, calcium chlorate, calcium fluoride, calcium gluconate, calcium hypochlorite, calcium iodate, calcium iodide, calcium lactate, calcium nitrite, calcium oxalate, calcium phosphate, calcium propionate, calcium silicate, calcium stearate, calcium sulfamate, calcium sulfate, calcium sulfate hemihydrate, calcium sulfate dihydrate, calcium sulfide, calcium tartrate, calcium aluminate, tricalcium silicate, dicalcium silicate and mixtures of two or more thereof.

10. A process according to Embodiment 9, wherein the water-soluble calcium compound is selected from calcium sulfamate, calcium acetate, calcium chloride, calcium formate, calcium sulfate and mixtures of two or more thereof.

11. A process according to any of Embodiments 1 to 10, wherein the water-soluble calcium compound is not calcium silicate, dicalcium silicate or tricalcium silicate.

12. A process according to any of Embodiments 1 to 11, wherein the ratio of m:n is from about 2.5 to about 4, or from about 2 to about 3.8.

13. A process according to Embodiment 12, wherein ratio of m:n is from about 2.5 to about 3.8, in particular from about 2.5 to about 3.6.

14. A process according to Embodiment 12, wherein ratio of m:n is from about 3.0 to about 3.8, in particular from about 3 to about 3.6.

15. A process according to any one of Embodiment 12 to 14, wherein the water-soluble silicate compound is waterglass powder.

15. A process according to any of Embodiments 1 to 15, wherein the water-soluble dispersing agent is a copolymer which is produced by free radical polymerization in the presence of acid monomer, preferably carboxylic acid monomer and polyether macromonomer, so that altogether at least 45 mol %, preferably at least 80 mol %, of all structural units of the copolymer are produced by incorporation of acid monomer, preferably carboxylic acid monomer and polyether macromonomer in the form of polymerized units.

17. A process according to any one of Embodiments 1 to 16, wherein the dispersing agent is a copolymer which includes at least one structural unit having the general formulae (Ia), (Ib), (Ic) and/or (Id):

where
$R^1$ is H or branched or unbranched $C_1$-$C_4$ alkyl, $CH_2COOH$ or $CH_2CO$—X—$R^3$, preferably H or $CH_3$;
X is NH—$(C_nH_{2n})$ or O—$(C_nH_{2n})$ where n=1, 2, 3 or 4, wherein the nitrogen atom or the oxygen atom is bound to the CO group, or X is a chemical bond, preferably a chemical bond or O—$(C_nH_{2n})$;
$R^2$ is OM, $PO_3M_2$, or O—$PO_3M_2$; with the proviso that X is a chemical bond, if $R^2$ is OM;
$R^3$ is $PO_3M_2$, or O—$PO_3M_2$;

where
$R^3$ is H or branched or unbranched $C_1$-$C_4$ alkyl, preferably H oder $CH_3$;
n=0, 1, 2, 3 or 4, preferably 0 or 1;
$R^4$ is $PO_3M_2$, O—$PO_3M_2$,

where
$R^5$ is H or branched or unbranched $C_1$-$C_4$ alkyl, preferably H oder $CH_3$;
Z is O or $NR^7$, preferably O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$;
n is 1, 2, 3 or 4, preferably 1, 2 or 3;

where
R⁶ is H or branched or unbranched $C_1$-$C_4$ alkyl, preferably H;
Q is O or NR⁷, preferably O;
R⁷ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$;
n is 1, 2, 3 or 4, preferably 1, 2 or 3;
wherein in said formulae each M independently is H or a cation equivalent.

18. A process according to Embodiment 17, wherein the dispersing agent includes as anionic or anionogenic group at least one structural unit of formula (Ia), wherein R¹ is H or $CH_3$; and/or at least one structural unit of formula (Ib), wherein R³ is H or $CH_3$; and/or at least one structural unit of formula (Ic), wherein R⁵ is H or $CH_3$ and Z is O; and/or at least one structural unit of formula (Id), wherein R⁶ is H and Q is O.

19. A process according to Embodiment 17 or 18, wherein the dispersing agent includes as anionic or anionogenic group at least one structural unit of formula (Ia), wherein R¹ is H or $CH_3$ and XR² is OM or X is $O(C_nH_{2n})$ with n=1, 2, 3 or 4, in particular 2, and R² is O—$PO_3M_2$.

20. A process according to any one of Embodiments 1 to 19, wherein the dispersing agent is a copolymer which comprises at least one structural unit having the general formulae (IIa), (IIb), (IIc) and/or (IId):

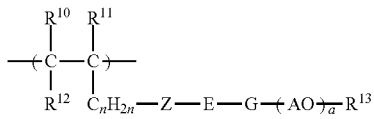
(IIa)

where
R¹⁰, R¹¹ and R¹² are independently of one another, H or branched or unbranched $C_1$-$C_4$ alkyl;
Z für O oder S steht;
E is branched or unbranched $C_1$-$C_6$-alkylene, cyclohexylene, $CH_2$—$C_6H_{10}$, 1,2-phenylene, 1,3-phenylene, or 1,4-phenylene;
G is O, NH or CO—NH, or E and G together form a chemical bond;
A is $C_xH_{2x}$ where x=2, 3, 4 or 5 (preferably x=2 or 3) or $CH_2CH(C_6H_5)$;
n is 0, 1, 2, 3, 4 or 5, preferably 0, 1 or 2;
a is an integer from 2 to 350 (preferably 5 to 150); and
R¹³ is H, branched or unbranched $C_1$-$C_4$ alkyl, CO—$NH_2$ or $COCH_3$;

(IIb)

where
R¹⁶, R¹⁷ and R¹⁸ are independently of one another, H or branched or unbranched $C_1$-$C_4$ alkyl;
E is branched or unbranched $C_1$-$C_6$-alkylene, cyclohexylene, $CH_2$—$C_6H_{10}$, 1,2-phenylene, 1,3-phenylene, or 1,4-phenylene;
A is $C_xH_{2x}$ where x=2, 3, 4 or 5, preferably 2 or 3, or $CH_2CH(C_6H_5)$;
L is $C_xH_{2x}$ with x=2, 3, 4 or 5, preferably 2 or 3, or $CH_2$—$CH(C_6H_5)$;
a is an integer from 2 to 350, preferably 5 to 150;
d is an integer from 1 to 350, preferably 5 to 150;
R¹⁹ is H or branched or unbranched $C_1$-$C_4$-alkyl;
R²⁰ is H or branched or unbranched $C_1$-$C_4$-alkyl; and
n is 0, 1, 2, 3, 4 or 5, preferably 0, 1 or 2;

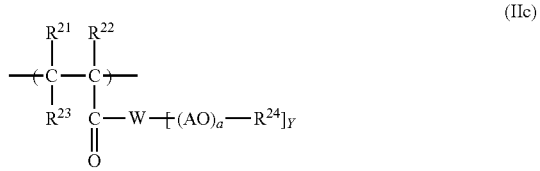
(IIc)

where
R²¹, R²² and R²³ independently of each other are H or branched or unbranched $C_1$-$C_4$-alkyl;
W is O, NR²⁵ or N;
Y is 1, if W=O or NR²⁵, and is 2, if W=N;
A is $C_xH_{2x}$ with x=2, 3, 4 or 5, preferably 2 or 3, or $CH_2CH(C_6H_5)$;
a is an integer from 2 to 350, preferably 5 to 150;
R²⁴ is H or branched or unbranched $C_1$-$C_4$-alkyl;
R²⁵ is H or branched or unbranched $C_1$-$C_4$-alkyl;

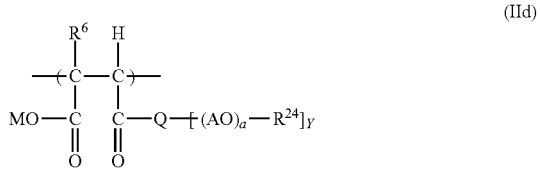
(IId)

wherein
R⁶ is H or branched or unbranched $C_1$-$C_4$-alkyl;
Q is NR¹⁰, N or O;
Y is 1, if Q=O or NR¹⁰, and is 2, if Q=N;
R¹⁰ is H or branched or unbranched $C_1$-$C_4$-alkyl;
M is H or a cation equivalent;
R²⁴ is H or branched or unbranched $C_1$-$C_4$-alkyl;
A is $C_xH_{2x}$ with x=2, 3, 4 or 5, preferably 2 or 3, or $CH_2CH(C_6H_5)$; and
a is an integer from 2 to 350, preferably 5 to 150.

21. A process according to embodiment 20, wherein the polyether side chain of the dispersing agent comprises
(a) at least one structural unit (IIa), wherein R¹⁰ and R¹² are H, R¹¹ is H or $CH_3$, E and G together form a chemical bond, A is $C_xH_{2x}$ with x=2 and/or 3, a is 3 to 150, and R¹³ is H or branched or unbranched $C_1$-$C_4$-alkyl; and/or
(b) at least one structural unit (IIb), wherein R¹⁶ and R¹⁸ are H, R¹⁷ is H or $CH_3$, E is branched or unbranched $C_1$-$C_4$-alkylene, A is $C_xH_{2x}$ with x=2 and/or 3, L is $C_xH_{2x}$ with x=2 and/or 3, a is an integer from 2 to 150, d is an integer from 1 to 150, R¹⁹ is H or branched or unbranched $C_1$-$C_4$-alkyl; and R²⁰ is H or branched or unbranched $C_1$-$C_4$-alkyl; and/or
(c) at least one structural unit (IIc), wherein R²¹ and R²³ are H, R²² is H or $CH_3$, A is $C_xH_{2x}$ with x=2 and/or 3, a is an integer from 2 to 150, and R²⁴ is H or branched or unbranched $C_1$-$C_4$-alkyl; and/or (d) at least one structural unit (IId), wherein $R^6$ is H, Q is O, n is 2 and/or 3, A is $C_xH_{2x}$ with x=2 and/or 3, and a is an integer from 1 to 150, and $R^{24}$ is H or branched or unbranched $C_1$-$C_4$-alkyl.

22. A process according to Embodiment 20 or 21, wherein the dispersing agent comprises at least one structural unit of formula (IIa) and/or (IIc).

23. A process according to any one of Embodiments 1 to 15, wherein the dispersing agent is a polycondensation product comprising structural units (III) and (IV):

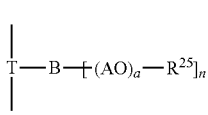

(III)

wherein
T is substituted or unsubstituted phenyl or naphthyl or substituted or unsubstituted heteroaryl with 5 to 10 ring atoms, of which 1 or 2 atoms are heteroatoms, which are selected from N, O and S;
n is 1 or 2;
B is N, NH or O, with the proviso that n is 2, if B is N and with the proviso that n is 1, if B is NH or O;
A is $C_xH_{2x}$ with x=2, 3, 4 or 5, preferably 2 or 3, or $CH_2CH(C_6H_5)$;
a is an integer from 1 to 300, preferably 5 b is 150;
$R^{25}$ is H or branched or unbranched $C_1$-$C_{10}$-alkyl, $C_5$-$C_8$-cycloalkyl, aryl, or heteroaryl with 5 to 10 ring atoms, of which 1 or 2 atoms are heteroatoms, which are selected from N, O and S, and preferably H;
wherein structural unit (IV) is selected from structural units (IVa) and (IVb):

(IVa)

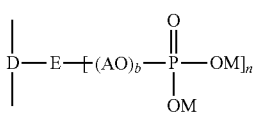

wherein
D is substituted or unsubstituted phenyl, substituted or unsubstituted naphthyl or substituted or unsubstituted heteroaryl with 5 to 10 ring atoms, of which 1 or 2 atoms are heteroatoms, which are selected from N, O and S;
E is N, NH or O, with the proviso that n is 2, if E is N and with the proviso that n is 1, if E is NH or O;
A is $C_xH_{2x}$ with x=2, 3, 4 or 5, preferably 2 or 3, or $CH_2CH(C_6H_5)$;
b is an integer from 1 to 300, preferably 5 b is 150;
M is independently H or a cation equivalent;

(IVb)

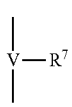

wherein
V is substituted or unsubstituted phenyl or naphthyl;
$R^7$ is COOM, $OCH_2COOM$, $SO_3M$ or $OPO_3M_2$;
M is H or a cation equivalent;

wherein said phenyl, naphthyl or heteroaryl is optionally substituted by one or two groups selected from $R^8$, OH, $OR^8$, $(CO)R^8$, COOM, $COOR^8$, $SO_3R^8$ and $NO_2$, preferably OH, $OC_1$-$C_4$-Alkyl and $C_1$-$C_4$-alkyl; and
$R^8$ is $C_1$-$C_4$-alkyl, phenyl, naphthyl, phenyl-$C_1$-$C_4$-alkyl or $C_1$-$C_4$-alkylphenyl.

24. A process according to Embodiment 23, wherein the dispersing agent includes a polycondensation product comprising structural units (III) and (IV), wherein T is substituted or unsubstituted phenyl or naphthyl, E is NH or O, A is $C_xH_{2x}$ with x=2 and/or 3, a is an integer from 1 to 150, and $R^{25}$ is H or branched or unbranched $C_1$-$C_{10}$-alkyl.

25. A process according to Embodiment 23, wherein D is substituted or unsubstituted phenyl or naphthyl, E is NH or O, A is $C_xH_{2x}$ with x=2 and/or 3, and b is an integer from 1 to 150.

26. A process according to any one of Embodiments 22 to 25, wherein T and/or D is phenyl or naphthyl which is substituted by 1 or 2 $C_1$-$C_4$-alkyl, hydroxy or 2 $C_1$-$C_4$-alkoxy.

27. A process according to Embodiment 23, wherein V is phenyl or naphthyl which is substituted by 1 or 2 $C_1$-$C_4$-alkyl, OH, $OCH_3$ oder COOM, and $R^7$ is COOM or $OCH_2COOM$.

28. A process according to any one of Embodiments 22 to 27, wherein the polycondensation product comprises a further structural unit (V) of the formula

(V)

wherein
$R^5$ and $R^6$ may be the same or different and are H, $CH_3$, COOH or substituted or unsubstituted phenyl or naphthyl or substituted or unsubstituted heteroaryl with 5 to 10 ring atoms, of which 1 or 2 atoms are heteroatoms, which are selected from N, O and S.

29. A process according to Embodiment 28, wherein $R^5$ and $R^6$ in the structural unit (V) may be the same or different and are preferably H, $CH_3$, or COOH, in particular H or one of $R^5$ and $R^6$ is H and the other is $CH_3$.

30. A process according to any one of Embodiments 1 to 27, wherein the polymeric dispersing agent comprises structural units of formulae (I) and (II), in particular of formulae (Ia) und (IIa).

31. A process according to Embodiment 30, wherein the polymeric dispersing agent comprises structural units of formulae (Ia) und (IIc).

32. A process according to Embodiment 30, wherein the polymeric dispersing agent comprises structural units of formulae (Ic) und (IIa).

33. A process according to Embodiment 30, wherein the polymeric dispersing agent comprises structural units of formulae (Ia), (Ic) und (IIa).

34. A process according to Embodiment 30, wherein the polymeric dispersing agent is formed from (i) anionic or anionogenic structural units derived from monomers selected from: acrylic acid, methacrylic acid, maleic acid, hydroxyethylacrylate phosphoric acid ester, and/or hydroxyethylmethacrylate phosphoric acid ester, hydroxyethylacrylate phosphoric acid diester, and/or hydroxyethylmethacrylate phosphoric acid diester and (ii) polyether side chain structural units derived from $C_1$-$C_4$- alkyl-polyethylenglycol acrylic acid ester, polyethylenglykol acrylic acid ester, $C_1$-$C_4$-alkyl-polyethylenglykol methacrylic acid ester, polyethylenglykol methacrylic acid ester, $C_1$-$C_4$-alkyl-polyethylenglykol acrylic acid ester, polyethylenglykol acrylic acid ester, vinyloxy-$C_2$-$C_4$-alkylen-polyethylenglykol, vinyloxy-$C_2$-$C_4$-alkylen-polyethylenglykol-$C_1$-$C_4$-alkylether, allyloxy-polyethylenglykol, allyloxy-polyethylenglykol-$C_1$-$C_4$-alkylether, methallyloxy-polyethylenglykol, methallyloxy-polyethylenglykol-$C_1$-$C_4$-alkylether, isoprenyloxy-polyethylenglykol, isoprenyloxy-polyethylenglykol-$C_1$-$C_4$-alkylether and mixtures of two or more thereof.

35. A process according to Embodiment 30, wherein the polymeric dispersing agent is formed from structural units (i) and (ii) which are derived from the following monomers
(i) Hydroxyethylacrylate phosphoric acid ester and/or hydroxyethylmethacrylate phosphoric acid ester and (ii) $C_1$-$C_4$-alkyl-polyethylenglykol acrylic acid ester and/or $C_1$-$C_4$-alkyl-polyethylenglykol methacrylic acid ester; or
(i) Acrylic acid and/or methacrylic acid and (ii) $C_1$-$C_4$-alkyl-polyethylenglykol acrylic acid ester and/or $C_1$-$C_4$-alkyl-polyethylenglykol methacrylic acid ester; or
(i) Acrylic acid, methacrylic acid and/or maleic acid and (ii) vinyloxy-$C_2$-$C_4$-alkylen-polyethylenglykol, allyloxy-polyethylenglykol, methallyloxy-polyethylenglykol and/or isoprenyloxy-polyethylenglykol.

36. A process according to Embodiment 35, wherein the polymeric dispersing agent is formed from structural units (i) and (ii) which are derived from the following monomers
(i) Hydroxyethylmethacrylate phosphoric acid ester and (ii) $C_1$-$C_4$-alkyl-polyethylenglykol methacrylic acid ester or polyethylenglykol methacrylic acid ester; or
(i) methacrylic acid and (ii) $C_1$-$C_4$-alkyl-polyethylenglykol methacrylic acid ester or polyethylenglykol methacrylic acid ester; or
(i) acrylic acid and maleic acid and (ii) vinyloxy-$C_2$-$C_4$-alkylen-polyethylenglykol or
(i) acryic acid and maleic acid and (ii) isoprenyloxy-polyethylenglykol or
(i) acrylic acid and (ii) vinyloxy-$C_2$-$C_4$-alkylen-polyethylenglykol or
(i) acrylic acid and (ii) isoprenyloxy-polyethylenglykol or
(i) acrylic acid and (ii) methallyloxy-polyethylenglykol or
(i) maleic acid and (ii) isoprenyloxy-polyethylenglykol or
(i) maleic acid and (ii) allyloxy-polyethylenglykol or
(i) maleic acid and (ii) methallyloxy-polyethylenglykol.

37. A process according to any one of Embodiments 17 to 22, wherein the molar ratio of structural units (I):(II) is 1:4 to 15:1, in particular 1:1 to 10:1.

38. A process according to any one of Embodiments 23 to 29, wherein the molar ratio of structural units (III):(IV) 4:1 b is 1:15, in particular 2:1 b is 1:10.

39. A process according to any one of Embodiments 23 to 30, wherein the molar ratio of structural units (III+IV):(V) 2:1 b is 1:3, in particular 1:0.8 b is 1:2.

40. A process according to any one of Embodiments 23 to 30, 38 or 39, wherein the polymeric dispersing agent is formed from structural units of formulae (III) and (IV) wherein T and D are phenyl or naphthyl, wherein the phenyl or naphthyl is optionally substituted by 1 or 2 $C_1$-$C_4$-alkyl, hydroxy or 2 $C_1$-$C_4$-alkoxy, B and E are 0, A is $C_xH_{2x}$ with x=2, a is 3 to 150, in particular 10 to 150, and b is 1, 2 or 3.

41. A process according to any one of the preceding Embodiments, wherein the molar ratio of calcium to silicium in the calcium silicate hydrate particles is 0.6 to 2, preferably 0.8 to 1.8, more preferably 0.9 to 1.6 and in particular 1.0 to 1.5.

42. A process according to any one of the preceding Embodiments, wherein the molar ratio of calcium to water in the calcium silicate hydrate particles is 0.6 to 6, preferably 0.6 to 4, and in particular 0.8 to 2.

43. A process according to any one of the preceding Embodiments, wherein the reaction is carried out completely or partially in the presence of a viscosity enhancer polymer, selected from the group of polysaccharide derivatives and/or (co)polymers with an average molecular weight $M_w$ higher than 500.000 g/mol, more preferably higher than 1.000.000 g/mol, the (co)polymers containing structural units derived (preferably by free radical polymerization) from non-ionic (meth)acrylamide monomer derivatives and/or sulphonic acid monomer derivatives.

44. A process according to Embodiment 43, wherein the viscosity enhancer polymer is a polysaccharide derivative selected from the group of methylcellulose, hydroxyethylcellulose (HEC), hydroxypropylcellulose (HPC), methylhydroxyethylcellulose (MHEC), methylhydroxypropylcellulose (MHPC) and/or (co)polymers with an average molecular weight $M_w$ higher than 500.000 g/mol, more preferably higher than 1.000.000 g/mol, the (co)polymers containing structural units derived (preferably by free radical polymerization) from non-ionic (meth)acrylamide monomer derivatives selected from the group of acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N, N-dimethylamino-ethylacrylamide and/or N-tert-butylacrylamide, preferably acrylamide, and/or sulfonic acid monomer derivatives selected from the group of 2-acrylamido-2-methylpropanesulfonic acid, 2-methacrylamido-2-methylpropanesulfonic acid, 2-acrylamidobutanesulfhonic acid, and/or 2-acrylamido-2,4,4-trimethylpentanesulfonic acid or the salts of the acids mentioned.

45. A process according to any one of the preceding Embodiments wherein the reaction is carried out completely or partially in the presence of an aqueous solution containing hardening accelerators selected from the group of alkanolamines, preferably triisopropanolamine and/or tetrahydroxyethyl ethylene diamine.

46. A process according to any one of the preceding Embodiments wherein the reaction is carried out completely or partially in the presence of a setting retarder selected from the group of citric acid, tartaric acid, gluconic acid, phosphonic acid, amino-trimethylenphosphonic acid, ethylendiaminotetra(methylenphosphonic) acid, diethylentriaminopenta(methylenphosphonic) acid, in each case including the respective salts of the acids, pyrophosphates, pentaborates, metaborates and/or sugars.

47. A process according to any one of the preceding Embodiments, followed by a process step in which the hardening accelerator composition is dried, preferably by a spray drying or drum drying process.

48. A process according to Embodiment 47, wherein the powder has a watercontent of less than 10% by weight, as determined by weight loss after heating to 100° C. for 3 h.

49. Hardening accelerator composition obtainable by the process according to any of Embodiments 1 to 48.

50. Composition according to claim 49, preferably aqueous hardening accelerator suspension, containing calcium silicate hydrate particles with a particle diameter smaller than 500 nm, preferably smaller than 300 nm, more preferably smaller than 200 nm, the particle size of the calcium silicate hydrate being measured by analytical ultracentrifugation.
51. Composition according to Embodiment 50, in which the calcium silicate hydrate is foshagite, hillebrandite, xonotlite, nekoite, clinotobermorite, 9 Å-tobermorite (riversiderite), 11 Å-tobermorite, 14 Å-tobermorite (plombierite), jennite, metajennite, calcium chondrodite, afwillite, α-$C_2SH$, dellaite, jaffeite, rosenhahnite, killalaite and/or suolunite.
52. Composition according to Embodiment 51, in which the calcium silicate hydrate is xonotlite, 9 Å-tobermorite (riversiderite), 11 Å-tobermorite, 14 Å-tobermorite (plombierite), jennite, metajennite, afwillite and/or jaffeite.
53. Use of a hardening accelerator composition according to any of Embodiments 49 to 52 in building material mixtures containing cement, gypsum, α-hemihydrate, α/β-hemihydrate, β-hemihydrate, natural anhydrite, synthetic anhydrite, aus der anhydrite obtained from flue gas desulfurization, slag, preferably ground granulated blast furnace slag, fly ash, silica dust, metakaolin, natural pozzolans, calcined oil shale, calcium sulfoaluminate cement and/or calcium aluminate cement, preferably in building material mixtures which contain substantially cement as a hydraulic binder.
54. Building material mixtures containing a hardening accelerator composition according any of Embodiments 49 to 52 and cement, gypsum, anhydrite, slag, preferably ground granulated blast furnace slag, fly ash, silica dust, metakaolin, natural pozzolans, calcined oil shale, calcium sulpho aluminate cement and/or calcium aluminate cement.
55. The use of the hardening accelerator composition according any of Embodiments 49 to 52 as a grinding agent in the preparation of (portland)cement, slag, fly ash, lime, puzzolane, or a mixture thereof, in particular (Portland)cement.
56. The use of the hardening accelerator composition according any of Embodiments 49 to 52 in oil and gas bores, in particular in the development, exploitation and completion of subterranean oil and gas reservoirs as well as deep bores.
57. The use of the hardening accelerator composition according any of Embodiments 49 to 52 for the acceleration of the setting of cement slurries in the cementing of oil and gas bore wells.

In the context of the present invention, the dispersing agent is, in general, a comb polymer suitable as a plasticizer for hydraulic binders. Comb polymers are to be understood as polymers which have relatively long side chains (having a molecular weight of in each case at least 200 g/mol, particularly preferable at least 400 g/mol) on a linear main chain at more or less regular intervals. The lengths of these side chains are frequently approximately equal but may also differ greatly from each other (for example when polyether macromonomers having side chains of different length are incorporated in the form of polymerized units). Such polymers can be obtained for example by a radical polymerization of acid monomers and polyether macromonomers. Esterification and/or amidation of poly(meth)acrylic acid and similar (co)polymers like for example acrylic/maleic acid copolymers with suitable monohydroxy functional, respectively monoamino functional polyalkylene glycols, preferably alkyl polyethylene glycols is an alternative route to such comb polymers. Comb polymers obtainable by esterification and/or amidation of poly(meth)acrylic acid are for example described in EP1138697B1, the disclosure of which is incorporated by reference.

Preferably the average molecular weight $M_w$ as determined by gel permeation chromatography (GPC) of the water-soluble comb-polymer suitable as a plasticizer for hydraulic binders is from 5.000 to 200.000 g/mol, more preferably from 10.000 to 80.000 g/mol, most preferably from 20.000 to 70.000 g/mol. The polymers were analysed by means of size exclusion chromatography with respect to average molar mass and conversion (column combination: OH-Pak SB-G, OH-Pak SB 804 HQ and OH-Pak SB 802.5 HQ from Shodex, Japan; Eluent: 80% by volume of aqueous solution of $HCO_2NH_4$ (0.05 mol/l) and 20% by volume of acetonitrile; injection volume 100 μl; flowrate 0.5 ml/min). The calibration for determining the average molar mass was effected using linear poly(ethylene oxide) and polyethylene glycol standards. As a measure of the conversion, the peak of the copolymer is standardized to a relative height of 1 and the height of the peak of the unconverted macromonomer/PEG-containing oligomer is used as a measure of the content of residual monomer.

Preferably the water-soluble comb polymer suitable as a plasticizer for hydraulic binders fulfils the requirements of the industrial standard EN 934-2 (February 2002).

In principle, the accelerator contains an inorganic and an organic component. The inorganic component may be regarded as modified, finely dispersed calcium silicate hydrate, which may contain foreign ions, such as magnesium and aluminium. The calcium silicate hydrate is prepared in the presence of the comb polymer plasticizer (organic component). Usually, a suspension containing the calcium silicate hydrate in finely dispersed form is obtained, which suspension effectively accelerates the hardening process of hydraulic binders and can act as a plasticizer. The suspension can be dried in a conventional manner, for example by spray drying or drum drying to give a powder having an accelerating activity that is comparable to the activity of the suspension product.

The inorganic component can in most cases be described with regard to its composition by the following empirical formula:

a CaO, $SiO_2$, b $Al_2O_3$, c $H_2O$, d X, e W
X is an alkali metal
W is an alkaline earth metal

| | | |
|---|---|---|
| $0.1 \leq a \leq 2$ | preferably | $0.66 \leq a \leq 1.8$ |
| $0 \leq b \leq 1$ | preferably | $0 \leq b \leq 0.1$ |
| $1 \leq c \leq 6$ | preferably | $1 \leq c \leq 6.0$ |
| $0 \leq d \leq 1$ | preferably | $0 \leq d \leq 0.4$ or $0.2$ |
| $0 \leq e \leq 2$ | preferably | $0 \leq e \leq 0.1$ |

In a preferred embodiment, the aqueous solution also contains, in addition to silicate and calcium ions, further dissolved ions which are preferably provided in the form of dissolved aluminium salts and/or dissolved magnesium salts. As aluminium salts preferably aluminium halides, aluminium nitrate, aluminium hydroxide and/or aluminium sulphate can be used. More preferable within the group of aluminium halides is aluminium chloride. Magnesium salts can be preferably magnesium nitrate, magnesium chloride and/or magnesium sulphate.

The aluminium salts and magnesium salts have the advantage that defects in the calcium silicate hydrate can be created via the introduction of ions different to calcium and silicon. This leads to an improved hardening acceleration effect. Preferably the molar ratio of aluminium and/or magnesium to calcium and silicon is small. More preferably the molar ratios are selected in a way that in the previous empirical formula the preferable ranges for a, b and e are fulfilled (0.66≤a≤1.8; 0≤b≤0.1; 0≤e≤0.1).

In a preferred embodiment of the invention, in a first step, the calcium source is mixed with the aqueous solution which contains a water-soluble comb polymer suitable as a plasticizer for hydraulic binders. To the obtained mixture the water-soluble silicate compound is added in a subsequent second step. The water-soluble silicate compound of the second step can also contain the water-soluble comb polymer.

The aqueous solution may also contain one or more further solvents (for example alcohols like ethanol and/or isopropanol) in addition to water. Preferably the weight proportion of the solvent other than water to the sum of water and further solvent (e.g. alcohol) is up to 20 weight %, more preferably less than 10 weight % and the most preferably less than 5 weight %. However most preferable are aqueous systems without any solvent. The temperature range in which the process is carried out is not especially limited. Certain limits however are imposed by the physical state of the system. It is preferable to work in the range of 0 to 100° C., more preferable 5 to 80° C. and most preferable 15 to 35° C. High temperatures can be reached especially when a milling process is applied. It is preferable not to exceed 80° C.

Also the process can be carried out at different pressures, preferably in a range of 1 to 5 bars.

The pH-value depends on the quantity of reactants (calcium source and water-soluble silicate) and on the solubility of the precipitated calcium silicate hydrate. It is preferable that the pH value is higher than 8 at the end of the synthesis, preferably in a range between 8 and 13.5.

In a preferred embodiment, the aqueous solution containing the comb polymer contains the calcium source and the water-soluble silicate compound. This means that the reaction of the calcium hydroxide and the water-soluble silicate compound in order to precipitate calcium silicate hydrate occurs in the presence of an aqueous solution which contains a water-soluble comb polymer suitable as a plasticizer for hydraulic binders.

In a preferred embodiment a solution or suspension of the calcium source and a solution of a water-soluble silicate compound are added, preferably separately and simultaneously, to the aqueous solution containing a water-soluble comb polymer suitable as a plasticizer for hydraulic binders. The advantage of this preparation method is its good practicability and the relatively small particle sizes of the obtained C—S—H.

In a further preferred embodiment of the invention the solution or suspension of the calcium source and/or the solution of a water-soluble silicate compound contain the water-soluble comb polymer. In this case the person skilled in the art will understand that the water-soluble comb polymer is distributed to at least two or three solutions or suspensions. It is advantageous that 1 to 50%, preferably 10 to 25% of the total of the water-soluble comb polymer are contained in the calcium source solution or suspension and/or silicate compound solution.

In a further embodiment, the addition of the calcium source and of the water-soluble silicate compound to the aqueous solution containing a water-soluble comb polymer is carried out in a cyclic semi-batch process with a first and a second reactor in series. The second reactor contains initially an aqueous solution of the water-soluble comb polymer. The first reactor is fed with the solution of the water-soluble silicate compound and the solution/suspension of the calcium source and with the contents of the second reactor. The outflow of the first reactor is added to the second reactor. That means, the content of the second reactor is circulated through the first reactor.

Alternatively, said addition is carried out in a continuous process in which the calcium source, the water-soluble silicate compound and the aqueous solution which contains the water-soluble comb polymer are mixed in the first reactor and the resulting outflow is fed into a mixed flow reactor or into a plug flow reactor.

Preferably the ratio of the volumes of the first and second reactor is from 1/10 to 1/20.000. Preferably the mass flow rate of the water-soluble calcium and water-soluble silicate compounds is small compared to the mass flow leaving the second and entering the first reactor, preferably the ratio is from 1/5 to 1/1000. Typically the first reactor can be a static or a dynamic mixing unit, preferably the mixing in the first reactor should be effective.

In general, the components are used in the following ratios:
i) 0.01 to 75, preferably 0.01 to 51, most preferably 0.01 to 15% by weight of calcium source,
ii) 0.01 to 75, preferably 0.01 to 55, most preferably 0.01 to 10% by weight of water-soluble silicate compound,
iii) 0.001 to 60, preferably 0.1 to 30, most preferable 0.1 to 10% by weight of water-soluble comb polymer suitable as a plasticizer for hydraulic binders,
iv) 24 to 99, preferably 50 to 99, most preferably 70 to 99% by weight of water.

Preferably the hardening accelerator composition is dosed at 0.01 to 10 weight %, most preferably at 0.1 to 2 weight % of the solids content with respect to the hydraulic binder, preferably cement. The solids content is determined in an oven at 60° C. until a constant weight of the sample is reached.

The calcium source may also be formed by compounds forming calcium hydroxide upon contact with water such as calcium carbide.

The calcium source may be used together with a water-soluble calcium compound selected from calcium chloride, calcium nitrate, calcium formate, calcium acetate, calcium bicarbonate, calcium bromide, calcium carbonate, calcium citrate, calcium chlorate, calcium fluoride, calcium gluconate, calcium hypochlorite, calcium iodate, calcium iodide, calcium lactate, calcium nitrite, calcium oxalate, calcium phosphate, calcium propionate, calcium silicate, calcium stearate, calcium sulfamate, calcium sulfate, calcium sulfate hemihydrate, calcium sulfate dihydrate, calcium sulfide, calcium tartrate calcium aluminate, tricalcium silicate and/or dicalcium silicate. Preferably the water-soluble calcium compound is not a calcium silicate. The silicates calcium silicate, dicalcium silicate and/or tricalcium silicate are less preferred because of low solubility (especially in the case of calcium silicate) and for economic reasons (price) (especially in case of dicalcium silicate and tricalcium silicate).

The water-soluble calcium compound is preferably calcium sulfamate, calcium acetate, calcium chloride, calcium formate and/or calcium sulfate. Advantage of these calcium compounds is their non-corrosiveness.

The weight ratio of calcium hydroxide or calcium oxide to the water-soluble calcium compound is in general in the range of from 1:0.01 to 1:0.5, in particular 1:0.1 to 1:0.3.

In the water-soluble silicate compound with the formula m $SiO_2$.n$M_2O$, the ratio of m:n is from about 2.0 to about 4. Preferably, the ratio of m:n is from about 2.0 to about 3.8, in particular from about 2.5 to about 3.8. According to a more preferred embodiment, the ratio is from about 2.5 to about 3.6, in particular from about 3.0 to about 3.8 or from about 3 to about 3.6. Preferably, the water-soluble silicate compound is waterglass which may be used as aqueous solution or as powder.

Water-soluble alkali metal ions (for example lithium, sodium, potassium ions) may be removed from the hardening accelerator composition by cation exchangers and/or water-soluble nitrate and/or chloride ions may be removed from the hardening accelerator composition by anion exchangers. Preferably the removal of said cations and/or anions is carried out in a second process step after the preparation of the hardening accelerator composition. Acid ion exchangers suitable as cation exchanger are for example based on sodium polystyrene sulfonate or poly-2-acrylamido-2-methylpropane sulfonic acid (poly AMPS). Basic ion exchangers are for example based on amino groups, like for example poly(acrylamido-N-propyltrimethylammonium chloride) (polyAPTAC).

In a preferred embodiment, the water-soluble comb polymer suitable as a plasticizer for hydraulic binders is a copolymer which contains, on the main chain, side chains having ether functions and anionic and/or anionogenic groups. Anionic groups are deprotonated acid groups in the polymeric dispersing agent. Anionogenic groups are the acid groups in the polymeric dispersing agent. It is also possible that the polymeric dispersing agent contains anionic and anionogenic groups simultaneously, for example partially deprotonated acid groups which are at least dibasic.

In a preferred embodiment, the water-soluble comb polymer suitable as a plasticizer for hydraulic binders is a copolymer which is produced by free radical polymerization in the presence of acid monomer, preferably carboxylic acid monomer, and polyether macromonomer, so that altogether at least 45 mol %, preferably at least 80 mol %, of all structural units of the copolymer are produced by incorporation of acid monomer, preferably carboxylic acid monomer, and polyether macromonomer in the form of polymerized units. Acid monomer is to be understood as meaning monomers which are capable of free radical copolymerization, have at least one carbon double bond, contain at least one acid function, preferably a carboxylic acid function, and react as an acid in an aqueous medium. Furthermore, acid monomer is also to be understood as meaning monomers which are capable of free radical copolymerization, have at least one carbon double bond, form at least one acid function, preferably a carboxylic acid function, in an aqueous medium as a result of a hydrolysis reaction and react as an acid in an aqueous medium (example: maleic anhydride or hydrolysable esters of (meth)acrylic acid). In the context of the present invention, polyether macromonomers are compounds which are capable of free radical copolymerization, have at least one carbon double bond, and have at least two ether oxygen atoms, with the proviso that the polyether macromonomer structural units present in the copolymer have side chains which contain at least two ether oxygen atoms, preferably at least 4 ether oxygen atoms, more preferably at least 8 ether oxygen atoms, most preferably at least 15 ether oxygen atoms.

Structural units, which do not constitute an acid monomer or a polyether macromonomer can be for example styrene and derivatives of styrene (for example methyl substituted derivatives), vinyl acetate, vinyl pyrrolidone, butadiene, vinyl proprionate, unsaturated hydrocarbons like for example ethylene, propylene and/or (iso)butylene. Preferred are monomers with not more than one carbon double bond.

In a preferred embodiment of the invention the water-soluble comb-polymer suitable as plasticizer for hydraulic binders is a copolymer of styrene and a half ester of maleic acid with a monofunctional polyalkylene glycol. Preferably such a copolymer can be produced by free radical polymerization of the monomers styrene and maleic anhydride (or maleic acid) in a first step. In the second step polyalkylene glycols, preferably alkyl polyalkylene glycols (preferably alkyl polyethylene glycols, most preferably methyl polyethyleneglycol) are reacted with the copolymer of styrene and maleic anhydride in order to achieve an esterification of the acid groups. Styrene can be completely or partially replaced by styrene derivatives, for example methyl substituted derivatives. Copolymers of this preferred embodiment are described in U.S. Pat. No. 5,158,996, the disclosure of which is incorporated into the present patent application.

In one embodiment, the polymeric dispersing agent is a copolymer comprising at least one structural unit having the general formulae (Ia), (Ib), (Ic) and/or (Id) (said units may be the same or different within one polymer molecule and within different polymer molecules)

(Ia)

where
$R^1$ is H or branched or unbranched $C_1$-$C_4$ alkyl, $CH_2COOH$ or $CH_2CO$—X—$R^3$, preferably H or $CH_3$;
X is NH—$(C_nH_{2n})$ or O—$(C_nH_{2n})$ where n=1, 2, 3 or 4, wherein the nitrogen atom or the oxygen atom is bound to the CO group, or X is a chemical bond, preferably a chemical bond or O—$(C_nH_{2n})$;
$R^2$ is OM, $PO_3M_2$, or O—$PO_3M_2$; with the proviso that X is a chemical bond, if $R^2$ is OM;
$R^3$ is $PO_3M_2$, or O—$PO_3M_2$;

(Ib)

where
$R^3$ is H or branched or unbranched $C_1$-$C_4$ alkyl, preferably H oder $CH_3$;
n=0, 1, 2, 3 or 4, preferably 0 or 1;
$R^4$ is $PO_3M_2$, O—$PO_3M_2$;

(Ic)

where
R$^5$ is H or branched or unbranched C$_1$-C$_4$ alkyl, preferably H oder CH$_3$
Z is O or NR$^7$, preferably O;
R$^7$ is H, (C$_n$H$_{2n}$)—OH, (C$_n$H$_{2n}$)—PO$_3$M$_2$, (C$_n$H$_{2n}$)—OPO$_3$M$_2$, (C$_6$H$_4$)—PO$_3$M$_2$, or (C$_6$H$_4$)—OPO$_3$M$_2$,
n is 1, 2, 3 or 4, preferably 1, 2 or 3;

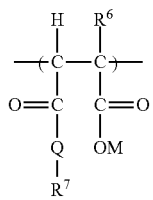
(Id)

where
R$^6$ is H or branched or unbranched C$_1$-C$_4$ alkyl, preferably H
Q is O or NR$^7$, preferably O;
R$^7$ is H, (C$_n$H$_{2n}$)—OH, (C$_n$H$_{2n}$)—PO$_3$M$_2$, (C$_n$H$_{2n}$)—OPO$_3$M$_2$, (C$_6$H$_4$)—PO$_3$M$_2$, or (C$_6$H$_4$)—OPO$_3$M$_2$,
n is 1, 2, 3 or 4, preferably 1, 2 or 3; and
wherein each M independently is H or a cation equivalent.

Preferably, the polymer includes as anionic or anionogenic group at least one structural unit of formula (Ia), wherein R$^1$ is H or CH$_3$; and/or at least one structural unit of formula (Ib), wherein R$^3$ is H or CH$_3$; and/or at least one structural unit of formula (Ic), wherein R$^5$ is H or CH$_3$ and Z is O; and/or at least one structural unit of formula (Id), wherein R$^6$ is H and Q is O.

The polymer includes as anionic or anionogenic group especially preferred at least one structural unit of formula (Ia), wherein R$^1$ is H or CH$_3$ and XR$^2$ is OM or X is O(C$_n$H$_{2n}$) with n=1, 2, 3 or 4, in particular 2, and R$^2$ is O—PO$_3$M$_2$.

The side chains of the polymeric dispersing agent comprise at least one structural unit having the general formulae (IIa), (IIb), (IIc) and/or (IId)

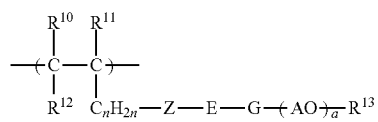
(IIa)

where
R$^{10}$, R$^{11}$ and R$^{12}$ are independently of one another, H or branched or unbranched C$_1$-C$_4$ alkyl;
Z für O oder S steht;
E is branched or unbranched C$_1$-C$_6$-alkylene, cyclohexylene, CH$_2$—C$_6$H$_{10}$, 1,2-phenylene, 1,3-phenylene, or 1,4-phenylene;
G is O, NH or CO—NH, or E and G together form a chemical bond;
A is C$_x$H$_{2x}$ where x=2, 3, 4 or 5 (preferably x=2 or 3) or CH$_2$CH(C$_6$H$_5$);
n is 0, 1, 2, 3, 4 or 5, preferably 0, 1 or 2;
a is an integer from 2 to 350 (preferably 5 to 150); and
R$^{13}$ is H, branched or unbranched C$_1$-C$_4$ alkyl, CO—NH$_2$ or COCH$_3$;

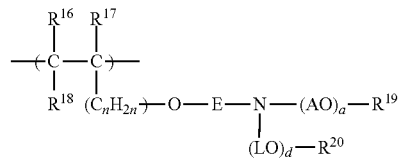
(IIb)

where
R$^{16}$, R$^{17}$ and R$^{18}$ are independently of one another, H or branched or unbranched C$_1$-C$_4$ alkyl;
E is branched or unbranched C$_1$-C$_6$-alkylene, cyclohexylene, CH$_2$—C$_6$H$_{10}$, 1,2-phenylene, 1,3-phenylene, or 1,4-phenylene;
A is C$_x$H$_{2x}$ where x=2, 3, 4 or 5, preferably 2 or 3, or CH$_2$CH(C$_6$H$_5$);
L is C$_x$H$_{2x}$ with x=2, 3, 4 or 5, preferably 2 or 3, or CH$_2$—CH(C$_6$H$_5$);
a is an integer from 2 to 350, preferably 5 to 150;
d is an integer from 1 to 350, preferably 5 to 150;
R$^{19}$ is H or branched or unbranched C$_1$-C$_4$-alkyl;
R$^{20}$ is H or unbranched C$_1$-C$_4$-alkyl; and
n is 0, 1, 2, 3, 4 or 5, preferably 0, 1 or 2;

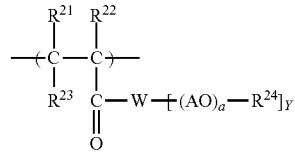
(IIc)

where
R$^{21}$, R$^{22}$ and R$^{23}$ independently of each other are H or branched or unbranched C$_1$-C$_4$-alkyl;
W is O, NR$^{25}$ or N;
Y is 1, if W=O or NR$^{25}$, and is 2, if W=N;
A is C$_x$H$_{2x}$ with x=2, 3, 4 or 5, preferably 2 or 3, or CH$_2$CH(C$_6$H$_5$);
a is an integer from 2 to 350, preferably 5 to 150;
R$^{24}$ is H or branched or unbranched C$_1$-C$_4$-alkyl;
R$^{25}$ is H or branched or unbranched C$_1$-C$_4$-alkyl;

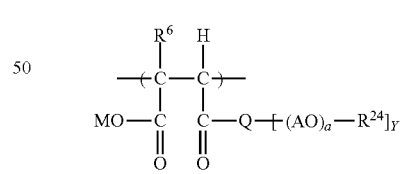
(IId)

wherein
R$^6$ is H or branched or unbranched C$_1$-C$_4$-alkyl;
Q is NR$^{10}$, N or O;
Y is 1, if Q=O or NR$^{10}$, and is 2, if Q=N;
R$^{10}$ is H or branched or unbranched C$_1$-C$_4$-alkyl;
M is H or a cation equivalent;
R$^{24}$ is H or branched or unbranched C$_1$-C$_4$-alkyl;
A is C$_x$H$_{2x}$ with x=2, 3, 4 or 5, preferably 2 or 3, or CH$_2$CH(C$_6$H$_5$); and
a is an integer from 2 to 350, preferably 5 to 150.

Preferably, the polymer comprises polyether side chains formed from (a) at least one structural unit (IIa), wherein $R^{10}$ and $R^{12}$ are H, $R^{11}$ is H or $CH_3$, E and G together form a chemical bond, A is $C_xH_{2x}$ with x=2 and/or 3, a is 3 to 150, and $R^{13}$ is H or branched or unbranched $C_1$-$C_4$-alkyl; and/or (b) at least one structural unit (IIb), wherein $R^{16}$ and $R^{18}$ are H, $R^{17}$ is H or $CH_3$, E is branched or unbranched $C_1$-$C_4$-alkylene, A is $C_xH_{2x}$ with x=2 and/or 3, L is $C_xH_{2x}$ with x=2 and/or 3, a is an integer from 2 to 150, d is an integer from 1 to 150, $R^{19}$ is H or branched or unbranched $C_1$-$C_4$-alkyl; and $R^{20}$ is H or branched or unbranched $C_1$-$C_4$-alkyl; and/or (c) at least one structural unit (IIc), wherein $R^{21}$ and $R^{23}$ are H, $R^{22}$ is H or $CH_3$, A is $C_xH_{2x}$ with x=2 and/or 3, a is an integer from 2 to 150, and $R^{24}$ is H or branched or unbranched $C_1$-$C_4$-alkyl; and/or (d) at least one structural unit (IId), wherein $R^6$ is H, Q is O, $R^7$ is $(C_nH_{2n})$—O-$(AO)_a$—$R^9$, n is 2 and/or 3, A für $C_xH_{2x}$ with x=2 and/or 3, a is an integer from 1 to 150, and $R^9$ is H or branched or unbranched $C_1$-$C_4$-alkyl.

Especially preferred the polymer comprises at least one structural unit of formula (IIa) and/or (IIc).

According to a further embodiment, the polymeric dispersing agent is a polycondensate comprising at least one aromatic or heteroaromatic structural unit with at least one polyether side chain and at least one aromatic or heteroaromatic structural unit with at least one phosphoric acid group or a salt thereof.

Preferably, the polymer includes a polycondensation product comprising structural units (III) and (IV):

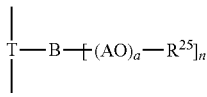
(III)

wherein
T is substituted or unsubstituted phenyl; substituted or unsubstituted naphthyl or substituted or unsubstituted heteroaryl with 5 to 10 ring atoms, of which 1 or 2 atoms are heteroatoms, which are selected from N, O and S;
n is 1 or 2;
B is N, NH or O, with the proviso that n is 2, if B is N and with the proviso that n is 1, if B is NH or O;
A is $C_xH_{2x}$ with x=2, 3, 4 or 5, preferably 2 or 3, or $CH_2CH(C_6H_5)$;
a is an integer from 1 to 300, preferably 5 b is 150;
$R^{25}$ is H or branched or unbranched $C_1$-$C_{10}$-alkyl, $C_5$-$C_8$-cycloalkyl, aryl, or heteroaryl with 5 to 10 ring atoms, of which 1 or 2 atoms are heteroatoms, which are selected from N, O and S;
wherein structural unit (IV) is selected from structural units (IVa) and (IVb):

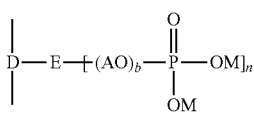
(IVa)

wherein
D is substituted or unsubstituted phenyl; substituted or unsubstituted naphthyl or substituted or unsubstituted heteroaryl with 5 to 10 ring atoms, of which 1 or 2 atoms are heteroatoms, which are selected from N, O and S;
E is N, NH or O, with the proviso that n is 2, if E is N and with the proviso that n is 1, if E is NH or O;
A is $C_xH_{2x}$ with x=2, 3, 4 or 5, preferably 2 or 3, or $CH_2CH(C_6H_5)$;
b is an integer from 1 to 300, preferably 5 b is 150;
M is independently H or a cation equivalent;

(IVb)

wherein
V is substituted or unsubstituted phenyl or substituted or unsubstituted naphthyl;
$R^7$ is COOM, $OCH_2COOM$, $SO_3M$ or $OPO_3M_2$;
M is H or a cation equivalent;
wherein said phenyl, naphthyl or heteroaryl is optionally substituted by one or two groups selected from $R^8$, OH, $OR^8$, $(CO)R^8$, COOM, $COOR^8$, $SO_3R^8$ and $NO_2$, preferably OH, $OC_1$-$C_4$-Alkyl and $C_1$-$C_4$-alkyl; and
$R^8$ is $C_1$-$C_4$-alkyl, phenyl, naphthyl, phenyl-$C_1$-$C_4$-alkyl or $C_1$-$C_4$-alkylphenyl.

Preferably, the polymer includes a polycondensation product comprising structural units (III) und (IV), wherein T is substituted or unsubstituted phenyl or naphthyl, E is NH or O, A is $C_xH_{2x}$ with x=2 and/or 3, a is an integer from 1 to 150, and $R^{25}$ is H or branched or unbranched $C_1$-$C_{10}$-alkyl.

Preferably, the polymer includes a polycondensation product comprising structural units (III) und (IV), wherein D is substituted or unsubstituted phenyl or naphthyl, E is NH or O, A is $C_xH_{2x}$ with x=2 and/or 3, and b is an integer from 1 to 150.

Especially preferred, the polymer includes a polycondensation product comprising structural units (III) and (IV), wherein T and/or D is phenyl or naphthyl which is substituted by 1 or 2 $C_1$-$C_4$-alkyl, hydroxy or 2 $C_1$-$C_4$-alkoxy.

The polycondensation product may comprise structural units (IVb), wherein V is phenyl or naphthyl which is substituted by 1 or 2 $C_1$-$C_4$-alkyl, OH, $OCH_3$ oder COOM, and $R^7$ is COOM or $OCH_2COOM$.

The polycondensation product may comprise at least one further structural unit (V) of the formula

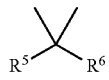
(V)

wherein
$R^5$ and $R^6$ may be the same or different and are H, $CH_3$, COOH or substituted or unsubstituted phenyl or naphthyl or substituted or unsubstituted heteroaryl with 5 to 10 ring atoms, of which 1 or 2 atoms are heteroatoms, which are selected from N, O and S.

$R^5$ and $R^6$ in the structural unit (V) may be the same or different and are preferably H, $CH_3$, or COOH, in particular H or one of $R^5$ and $R^6$ is H and the other is $CH_3$.

The structural units (III) are preferably derived from alkoxylated hydroxy-oder amino-functionalized aromatic or heteroaromatic compounds, for example alkoxylated phenoxyethanol, phenoxypropanol, 2-alkoxyphenoxyethanoles, 4-alkoxyphenoxyethanoles, 2-alkylphenoxyethanoles and 4-alkylphenoxyethanoles, N,N-(dihydroxyethyl)aniline, N-(hydroxyethyl)aniline, N,N-(dihydroxypropyl)aniline and N-(hydroxypropyl)aniline. Especially preferred are alkoxylated phenol derivates (for example phenoxyethanol or phenoxypropanol), in particular alkoxylated, especially ethoxylated phenol derivates having a weight average molecular weight from 300 g/mole to 10.000 g/mole (for example polyethyleneglycol monophenylether).

The structural units (IV) are preferably derived from phosphated, alkoxylated hydroxy- or amino-functionalized aromatic or heteroaromatic compounds, for example phenoxyethanolphosphate, polyethyleneglycol monophenyletherphosphates, N,N-(dihydroxyethyl)-anilindiphosphate, N,N-(dihydroxyethyl)anilinphosphate, N-(hydroxypropyl) anilinphosphate), which have at least one phosphoric acid ester group and/or a salt of the phosphoric acid ester group (for example by esterification with phosphoric acid and optionally addition of bases). Especially preferred are alkoxylated phenoles with at least one phosphoric acid ester group and/or a salt of the phosphoric acid ester group (for example polyethyleneglycol monophenyletherphosphates with less than 25 ethyleneglycol units), and especially preferred the alkoxylated phenols having a weight average molecular weight from 200 g/mole to 600 g/mole (for example phenoxyethanolphosphate, polyethyleneglycol monophenyletherphosphates with 2 to 10 ethyleneglycol units), the alkoxylated phenols having at least one phosphoric acid ester group and/or a salt of the phosphoric acid ester group (for example by esterification with phosphoric acid and optionally addition of bases).

The structural units (IV) are preferably derived from formaldehyde, acetaldehyde, acetone, glyoxylic acid, and/or benzaldehyde. Formaldehyde is preferred.

In an embodiment the polymer comprises structural units of formulae (I) and (II), in particular of formulae (Ia) und (IIa).

In a further embodiment the polymer comprises structural units of formulae (I) and (II), in particular of formulae (Ia) und (IIc).

In a further embodiment the polymer comprises structural units of formulae (I) and (II), in particular of formulae (Ic) und (IIa).

In a further embodiment the polymer comprises structural units of formulae (I) and (II), in particular of formulae (Ia), (Ic) and (IIa).

The polymer can be formed from (i) anionic or anionogenic structural units derived from acrylic acid, methacrylic acid, maleic acid, hydroxyethylacrylate phosphoric acid ester, and/or hydroxyethylmethacrylate phosphoric acid ester, hydroxyethylacrylate phosphoric acid diester, and/or hydroxyethylmethacrylate phosphoric acid diester and (ii) polyether side chain structural units derived from $C_1$-$C_4$-alkyl-polyethylenglycol acrylic acid ester, polyethylenglykol acrylic acid ester, $C_1$-$C_4$-alkyl-polyethylenglykol methacrylic acid ester, polyethylenglykol methacrylic acid ester, $C_1$-$C_4$-alkyl-polyethylenglykol acrylic acid ester, polyethylenglykol acrylic acid ester, vinyloxy-$C_2$-$C_4$-alkylen-polyethylenglykol, vinyloxy-$C_2$-$C_4$-alkylen-polyethylenglykol-$C_1$-$C_4$-alkylether, allyloxy-polyethylenglykol, allyloxy-polyethylenglykol-$C_1$-$C_4$-alkylether, methallyloxy-polyethylenglykol, methallyloxy-polyethylenglykol-$C_1$-$C_4$-alkylether, isoprenyloxy-polyethylenglykol and/or isoprenyloxy-polyethylenglykol-$C_1$-$C_4$-alkylether.

Preferably, the polymer is formed from structural units (i) and (ii) which are derived from
(i) Hydroxyethylacrylate phosphoric acid ester and/or hydroxyethylmethacrylate phosphoric acid ester and (ii) $C_1$-$C_4$-alkyl-polyethylenglykol acrylic acid ester and/or $C_1$-$C_4$-alkyl-polyethylenglykol methacrylic acid ester; or
(i) Acrylic acid and/or methacrylic acid and (ii) $C_1$-$C_4$-alkyl-polyethylenglykol acrylic acid ester and/or $C_1$-$C_4$-alkyl-polyethylenglykol methacrylic acid ester; or
(i) Acrylic acid, methacrylic acid and/or maleic acid and (ii) vinyloxy-$C_2$-$C_4$-alkylen-polyethylenglykol, allyloxy-polyethylenglykol, methallyloxy-polyethylenglykol and/or isoprenyloxy-polyethylenglykol.

Especially preferred, the polymer is formed from structural units (i) and (ii) derived from
(i) Hydroxyethylmethacrylate phosphoric acid ester and (ii) $C_1$-$C_4$-alkyl-polyethylenglykol methacrylic acid ester or polyethylenglykol methacrylic acid ester; or
(i) methacrylic acid and (ii) $C_1$-$C_4$-alkyl-polyethylenglykol methacrylic acid ester or polyethylenglykol methacrylic acid ester; or
(i) acrylic acid and maleic acid and (ii) vinyloxy-$C_2$-$C_4$-alkylen-polyethylenglykol or
(i) acryic acid and maleic acid and (ii) isoprenyloxy-polyethylenglykol or
(i) acrylic acid and (ii) vinyloxy-$C_2$-$C_4$-alkylen-polyethylenglykol or
(i) acrylic acid and (ii) isoprenyloxy-polyethylenglykol or
(i) acrylic acid and (ii) methallyloxy-polyethylenglykol or
(i) maleic acid and (ii) isoprenyloxy-polyethylenglykol or
(i) maleic acid and (ii) allyloxy-polyethylenglykol or
(i) maleic acid and (ii) methallyloxy-polyethylenglykol.

In an embodiment, the molar ratio of structural units (I):(II) is 1:4 to 15:1, in particular 1:1 to 10:1.

In another embodiment, the molar ratio of structural units (III):(IV) 4:1 b is 1:15, in particular 2:1 b is 1:10.

In another embodiment, the molar ratio of structural units (III+IV):(V) 2:1 b is 1:3, in particular 1:0.8 b is 1:2.

In an especially preferred embodiment, the polymer comprises a polycondensation product formed from structural units of formulae (III) and (IV) wherein T and D are phenyl or naphthyl, wherein the phenyl or naphthyl is optionally substituted by 1 or 2 $C_1$-$C_4$-alkyl, hydroxy or 2 $C_1$-$C_4$-alkoxy, B and E are O, A is $C_xH_{2x}$ with x=2, a is 3 to 150, in particular 10 to 150, and b is 1, 2 or 3.

The preparation of the polymeric dispersing agents containing structural units (I) and (II) occurs in a conventional manner, for example by free radical polymerization which is described for example in EP 894 811, EP 1 851 256, EP 2463314, EP 753488, incorporated herein in their entirety.

The preparation of the polymeric dispersing agents containing structural units (III), (IV) and (V) occurs typically according to a process in which the compounds corresponding to structural units (III), (IV) and (V) are reacted. The preparation of the polycondensates is described in US 2008/0108732, WO 2006/042709, and WO 2010/026155 incorporated herein in their entirety.

Alkoxylated isoprenol and/or alkoxylated hydroxybutyl vinyl ether and/or alkoxylated (meth)allyl alcohol and/or vinylated methylpolyalkylene glycol having preferably in each case an arithmetic mean number of 4 to 340 oxyalkylene groups is preferably used as the polyether macromonomer. Methacrylic acid, acrylic acid, maleic acid, maleic anhydride, a monoester of maleic acid or a mixture of a plurality of these components is preferably used as the acid monomer.

The accelerator composition as obtained after the reaction is a suspension. Preferably, it is dried and used in powdered form. Alternatively, it can be used as suspension. In that case, the process according to this invention may be carried out at a site of concrete production (for example a ready-mix concrete, precast concrete plant or any other plant where mortar, concrete or any other cementitious products are produced). It is then preferable to use the suspension as the batching water. Batching water in this context is the water, which is used in concrete production or production of similar cementitious materials. Typically the batching water is mixed with cement and for examples aggregates at a ready mix concrete plant or precast concrete plant, at a construction site or any other place where concrete or other cementitious materials are produced. Usually the batching water can contain a wide range of additives like for example plasticizers, hardening accelerators, retarders, shrinkage reducing additives, air entrainers and/or defoamers. It is advantageous to produce the hardening accelerators according to this invention in the batching water intended for production of concrete or similar materials, because there is no need to transport the respective admixtures.

In a further preferred embodiment of the invention, preferably carried out at a site of concrete production (for example a ready mix concrete or precast concrete plant), the weight ratio of the sum of calcium source, water-soluble silicate compound and comb polymer to water, preferably batching water, is between 1/1000 and 1/10, more preferably between 1/500 and 1/100.

The aqueous solution in which the reaction is carried out may contain besides the comb polymer a second polymer. The second polymer is a polycondensate as described in the previous text of this embodiment and following embodiments. Preferably the comb polymer used together with the polycondensate is obtainable by a radical polymerization.

In a further embodiment of the invention the reaction is carried out completely or partially in the presence of an aqueous solution containing a viscosity enhancer polymer, selected from the group of polysaccharide derivatives and/or (co)polymers with an average molecular weight $M_w$ higher than 500.000 g/mole, more preferably higher than 1.000.000 g/mol, the (co)polymers containing structural units derived (preferably by free radical polymerization) from non-ionic (meth)acrylamide monomer derivatives and/or sulfonic acid monomer derivatives. It is possible that the viscosity enhancer polymer is added at the beginning, during the process or at the end of the process. For example it can be added to the aqueous solution of the comb polymer, to the calcium compound and/or the silicate compound. The viscosity enhancer polymer can also be used during the process of preparing a hardening accelerator composition by reaction of a calcium compound, preferably a calcium salt, most preferably a water-soluble calcium salt with a silicon dioxide containing component. Preferably the viscosity enhancer polymer is added at the end of the reaction (at the end of the reactants addition) in order to prevent any particles to be destabilized and to keep the best stability. The viscosity enhancer has a stabilizing function in that segregation (aggregation and sedimentation) of for example calcium silicate hydrate) can be prevented. Preferably the viscosity enhancers are used at a dosage from 0.001 to 10 weight %, more preferably 0.001 to 1 weight % with respect to the weight of the hardening accelerator suspension. The viscosity enhancer polymer preferably should be dosed in a way that a plastic viscosity of the hardening accelerator suspensions higher than 80 mPa·s is obtained.

As polysaccharide derivative preference is given to cellulose ethers, for example alkylcelluloses such as methylcellulose, ethylcellulose, propylcellulose and methylethylcellulose, hydroxyalkylcelluloses such as hydroxyethylcellulose (HEC), hydroxypropylcellulose (HPC) and hydroxyethylhydroxypropylcellulose, alkylhydroxyalkylcelluloses such as methylhydroxyethylcelluose (MHEC), methylhydroxypropylcelluose (MHPC) and propylhydroxypropylcellulose. Preference is given to the cellulose ether derivatives methylcellulose (MC), hydroxypropylcellulose (HPC), hydroxyethylcellulose (HEC) and ethylhydroxyethylcellulose (EHEC), and particular preference is given to methylhydroxyethylcelluose (MHEC) and methylhydroxypropylcelluose (MHPC). The abovementioned cellulose ether derivatives, which can in each case be obtained by appropriate alkylation or alkoxylation of cellulose, are preferably present as non ionic structures, however it would be possible to use for example also carboxymethylcellulose (CMC). In addition, preference is also given to using non ionic starch ether derivatives such as hydroxypropylstarch, hydroxyethylstarch and methyl-hydroxypropylstarch. Preference is given to hydroxypropylstarch. Preferable are also microbially produced polysaccharides such as welan gum and/or xanthans and naturally occurring polysaccharides such as alginates, carregeenans and galactomannans. These can be obtained from appropriate natural products by extractive processes, for example in the case of alginates and carregeenans from algae, in the case of galactomannans from carob seeds.

The viscosity enhancer (co)polymers with a weight average molecular weight $M_w$ higher than 500.000 g/mole, more preferably higher than 1.000.000 g/mole can be produced (preferably by free radical polymerization) from non-ionic (meth)acrylamide monomer derivatives and/or sulfonic acid monomer derivatives. The respective monomers can be selected for example from the group of acrylamide, preferably acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide and/or sulfonic acid monomer derivatives selected from the group of styrene sulfonic acid, 2-acrylamido-2-methylpropanesulfonic acid, 2-methacrylamido-2-methylpropanesulfonic acid, 2-acrylamidobutanesulfonic acid, and/or 2-acrylamido-2,4,4-trimethylpentanesulfonic acid or the salts of the acids mentioned. It is preferable that the viscosity enhancer contains more than 50 mole %, more preferably more than 70 mole % of structural units derived from non-ionic (meth)acrylamide monomer derivatives and/or sulfonic acid monomer derivatives. Other structural units preferably being contained in the copolymers can be derived from for example the monomers (meth)acrylic acid, esters of (meth)acrylic acid with branched or non-branched $C_1$ to $C_{10}$ alcohols, vinyl acetate, vinyl propionate and/or styrene.

In a further embodiment of the invention the viscosity enhancer polymer is a polysaccharide derivative selected from the group of methylcellulose, hydroxyethylcellulose (HEC), hydroxypropylcellulose (HPC), methylhydroxyethylcellulose (MHEC), methylhydroxypropylcellulose (MHPC) and/or (co)polymers with an average molecular weight $M_w$ higher than 500.000 g/mole, more preferably higher than 1.000.000 g/mole, the (co)polymers containing structural units derived (preferably by free radical polymerization) from non-ionic (meth)acrylamide monomer derivatives selected from the group of acrylamide, preferably acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide and/or sulfonic acid monomer derivatives selected from the group of 2-acrylamido-2-methylpropanesulfonic acid, 2-methacrylamido-2-methylpropanesulfonic acid, 2-acrylamidobutanesulfonic acid, and/or 2-acrylamido-2,4,4-trimethylpentanesulfonic acid or the salts of the acids mentioned.

Within the group of non-ionic (meth)acrylamide monomer derivatives preference is given to methylacrylamide, N,N-dimethylacrylamide and/or methacrylamide, and particular preference is given to acrylamide. Within the group of sulfonic acid monomers 2-acrylamido-2-methylpropanesulfonic acid (AMPS) and its salts are preferable. The viscosity enhancer polymers can be added at the beginning of the process or at any other time.

In a further embodiment of the invention the reaction is carried out completely or partially in the presence of hardening accelerators selected from the group of alkanolamines, preferably triisopropanolamine and/or tetrahydroxyethyl ethylene diamine (THEED). The hardening accelerators are, in general, added in the form of an aqueous solution. Preferably the alkanolamines are used at a dosage from 0.01 to 2.5 weight % with respect to the weight of hydraulic binder, preferably cement. Synergistic effects could be found when using amines, especially triisopropanolamine and tetrahydroxyethyl ethylene diamine, with respect to the early strength development of hydraulic binder systems, especially cementitious systems. Preferably the amine is added at the end of the reaction.

In another embodiment the reaction is carried out completely or partially in the presence of setting retarders selected from the group of citric acid, tartaric acid, gluconic acid, phosphonic acid, amino-trimethylenphosphonic acid, ethylendiaminotetra(methylenphos-phonic)acid, diethylentriaminopenta-(methylenphosphonic) acid, in each case including the respective salts of the acids, pyrophosphates, pentaborates, metaborates and/or sugars (e.g. glucose, molasses). The setting retarders are, in general, added in the form of an aqueous solution. The advantage of the addition of setting retarders is that the open time can be controlled and in particular if necessary can be prolonged. The term "open-time" is understood by the person skilled in the art as the time interval after preparing the hydraulic binder mixture until the point of time at which the fluidity is considered as not sufficient anymore to allow a proper workability and the placement of the hydraulic binder mixture. The open-time depends on the specific requirements at the job site and on the type of application. As a rule the precast industry requires between 30 and 45 minutes and the ready-mix concrete industry requires about 90 minutes of open-time. Preferably the setting retarders are used at a dosage from 0.01 to 0.5 weight % with respect to the weight of hydraulic binder, preferably cement. The retarders can be added at the beginning of the process or at any other time.

In a preferred embodiment the hardening accelerator composition obtained according to any of the above mentioned embodiments is dried, preferably by a spray drying or drum drying process. The drying method is not especially limited, another possible drying method is for example the use of a fluid bed dryer. It is generally known that water, also if only in low quantities, is detrimental to many binders, especially cement, because of undesired premature hydration processes. Powder products with their typically very low content of water are advantageous compared to aqueous systems because it is possible to mix them into cement and/or other binders like gypsum, calcium sulphate hemihydrate (bassanite), anhydrous calcium sulphate, slags, preferably ground granulated blast furnace slag, fly ash, silica dust, metakaolin, natural pozzolan, calcined oil shale, calcium sulfoaluminate cement and/or calcium aluminate cement.

The invention furthermore relates to a hardening accelerator composition which is obtainable by the process described above.

According to another aspect of the invention, the accelerator composition contains particles with a particle diameter below 500 nm, preferably below 300 nm, more preferably below 200 nm. The measurement of the particle diameter is done at a temperature of 25° C. via the analytical ultra centrifuge Beckman Model Optima XLI from Beckman Coulter GmbH according to the description in H. Cölfen, 'Analytical Ultracentrifugation of Nanoparticles', in *Encyclopedia of Nanoscience and Nanotechnology*, (American Scientific Publishers, 2004), pp. 67-88.

Preferably the acceleration composition is free of hydraulic binders, especially free of cement (calcium silicate, dicalcium silicate or tricalcium silicate). "Free" means less than 10%, preferably less than 5%, in particular less than 1% by weight and especially 0%.

Preferably the composition contains
i) 0.1 to 75, preferably 0.1 to 50, the most preferably 0.1 to 10% by weight of calcium silicate hydrate,
ii) 0.001 to 60, preferably 0.1 to 30, most preferably 0.1 to 10% by weight of water-soluble comb polymer suitable as a plasticizer for hydraulic binders,
iii) 24 to 99, more preferably 50 to 99, most preferably 70 to 99% by weight of water.

Typically the calcium silicate hydrate in the composition, preferably aqueous hardening accelerator suspension, is foshagite, hillebrandite, xonotlite, nekoite, clinotobermorite, 9 Å-tobermorite (riversiderite), 11 Å-tobermorite, 14 Å-tobermorite (plombierite), jennite, metajennite, calcium chondrodite, afwillite, α-$C_2SH$, dellaite, jaffeite, rosenhahnite, killalaite and/or suolunite.

More preferably the calcium silicate hydrate in the composition, preferably aqueous hardening accelerator suspension, is xonotlite, 9 Å-tobermorite (riversiderite), 11 Å-tobermorite, 14 Å-tobermorite (plombierite), jennite, metajennite, afwillite and/or jaffeite.

In a preferred embodiment of the invention the molar ratio of calcium to silicon in the calcium silicate hydrate in the composition, preferably aqueous hardening accelerator suspension, is from 0.6 to 2, preferably 0.8 to 1.8, most preferably 0.9 to 1.5.

In a further preferred embodiment of the invention the molar ratio of calcium to water in the calcium silicate hydrate is from 0.6 to 6, preferably 0.6 to 2, more preferably 0.8 to 2. Said ranges are similar to those found for example in calcium silicate hydrate phases, which are formed during the hydration of cement. Advantage is a good acceleration effect for hydraulic binders.

It is particularly advantageous to use the hardening accelerators according to this invention in combination with cements containing a relatively high content of soluble sulfates (from 0.1 to 5 weight % with respect to the cement). Such cements are commercially available or the water-soluble sulphate salt can be added to the cement. Said cement is preferably rich in anhydrous aluminate phases. Preferably the water-soluble sulfate is selected from sodium and/or potassium sulfate. Combining the soluble sulfates and hardening accelerators according to this invention results into a synergetic hardening acceleration effect of cement.

The composition contains preferably setting retarders selected from the group of citric acid, tartaric acid, gluconic acid, phosphonic acid, amino-trimethylenphosphonic acid, ethylendiaminotetra-(methylenphosphonic) acid, diethylentriaminopenta(methylenphosphonic) acid, in each case including the respective salts of the acids, pyrophosphates, pentaborates, metaborates and/or sugars (e.g. glucose, molasses). The advantage of the addition of setting retarders is that the open-time can be controlled and in particular if necessary can be prolonged. Preferably the setting retarders are used at a dosage from 0.01 to 0.5 weight % with respect to the weight of hydraulic binder, preferably cement.

The compositions can also contain any formulation component typically used in the field of construction chemicals, preferably defoamers, air entrainers, retarders, shrinkage reducers, redispersible powders, other hardening accelerators, anti-freezing agents and/or anti-efflorescence agents.

The invention concerns also a hardening accelerator composition, which is in powder form. The powder product can be obtained from the aqueous product as described above, for example by spray drying or drying in a fluid bed dryer.

The invention comprises the use of a hardening accelerator composition obtainable according to any of the processes of the present invention or of a composition according to this invention in building material mixtures containing cement, gypsum, anhydrite, slag, preferably ground granulated blast furnace slag, fly ash, silica dust, metakaolin, natural pozzolans, calcined oil shale, calcium sulfoaluminate cement and/or calcium aluminate cement, preferably in building material mixtures which contain substantially cement as a hydraulic binder.

The invention further comprises the use of a hardening accelerator composition of the present invention as a grinding agent in the preparation of (Portland)cement, slag, fly ash, lime, puzzolane, or a mixture thereof, in particular (Portland)cement.

The invention further comprises the use of a hardening accelerator composition of the present invention in oil and gas bores, in particular in the development, exploitation and completion of subterranean oil and gas reservoirs as well as deep bores. The compositions are useful as setting accelerators for inorganic binders, in particular for accelerating the setting of cement slurries in the cementing of oil and gas bore wells.

Suitable inorganic binders are in particular Portland cements, calciumaluminate cements, gypsum, anhydrite, blast furnace slag, ground granulated blast furnace slag, fly ashes, silica fume, metakaolin, natural and artificial puzzolanes, and/or calcined oil shale, preferably Portland cements.

The use of the hardening accelerator compositions occurs preferably together with other additives useful in well bore cementing, such as water reducing agents, water retention agents and/or rheology modifying agents.

Gypsum comprises in this context all possible calcium sulfate carriers with different amounts of crystal water molecules, like for example also calcium sulfate hemihydrate.

The invention also concerns building material mixtures, which contain a composition, preferably an aqueous hardening accelerator suspension, according to this invention and cement, gypsum, anhydrite, slag, preferably ground granulated blast furnace slag, fly ash, silica dust, metakaolin, natural pozzolans, calcined oil shale, calcium sulfo aluminate cement and/or calcium aluminate cement. Preferably the building material mixtures contain substantially cement as a hydraulic binder. The hardening accelerator composition is contained in the building material mixture preferably at a dosage of 0.05 weight % to 5 weight % with respect to the clinker weight.

For illustration the term building material mixtures can mean mixtures in dry or aqueous form and in the hardened or plastic state. Dry building material mixtures could be for example mixtures of said binders, preferably cement and the hardening accelerator compositions (preferably in powder form) according to this invention. Mixtures in aqueous form, usually in the form of slurries, pastes, fresh mortar or fresh concrete are produced by the addition of water to the binder component(s) and the hardening accelerator composition, they transform then from the plastic to the hardened state.

The process of the invention is broadly applicable and can easily be carried out. The hardening accelerator composition which is obtained by the process of the invention can be obtained in powder form, has a low salt content and is therefore less corrosive and less critical from a safety and environmental aspect. Furthermore, it is a low cost product.

EXAMPLES

Starting Materials:
Si-source: Na-waterglass—modulus $SiO_2/Na_2O$=3.4 (solids content: 36% by weight)
Ca-sources:
  $Ca(OH)_2$ (purity 97%)
  CaAcetat (purity 99,9%)
  CaFormiat (purity 99,9%)
Polymers:
Polymer 1:
  Polymer 1 is a comb polymer based on the monomers maleic acid, acrylic acid and vinyloxybutylpolyethylene glycol-5800. The molar ratio of acrylic acid to maleic acid is 7. Mw=40.000 g/mol as determined by GPC. The solids content is 45% by weight. The synthesis is, for example, disclosed in EP0894811. The charge density is 930 µeq/g.
Polymer 2:
  Polymer 2 is a comb polymer that is a condensate of the components PhenolPEG5000 and phenoxyethanol phosphate. The molecular weight is 23.000 g/mol. The synthesis is, for example, disclosed in DE102004050395. The solids content is 31%. The charge density is 745 µeq/g.
Polymer 3:
  Polymer 3 is a comb polymer based on the monomers acrylic acid and vinyloxybutylpolyethylene glycol-3000. Mw=40.000 g/mol as determined by GPC. The solids content is 52% by weight. The charge density is 1410 µeq/g.
Preparation Procedure:
  a. The polymer was mixed with water and charged into a reactor;
  b. The calcium source was prepared by mixing calcium hydroxide and, optionally, another calcium source with water and optionally a polymer;
  c. The silicate solution was prepared by mixing a sodium waterglass with water;
  d. The aqueous polymer solution (a) was circulated through a 20 ml mixing cell equipped with an Ika Ultra Turrax provided with a Rotor-Stator mixing tool at 8000 rpm;
  e. The silicate source (c) and the calcium source (b) were introduced into the shear zone of the mixing cell;
Duration of the synthesis: 20 min.

The components used and their amounts are given in table 1.

TABLE 1

| Example | Reactor charge | Silicate source | Calcium source |
| --- | --- | --- | --- |
| H1 - reference | 328.6 g H$_2$O | 35.8 g Na-waterglass + 50.0 g H$_2$O | 8.6 g Ca(OH)$_2$ + 7.6 g Ca-acetate + 69.2 g H$_2$O |
| H2 | 289.9 g H$_2$O + 30.3 g Polymer 3 + 8.4 g Polymer 2 | 35.8 g Na-waterglass + 50.0 g H$_2$O | 8.6 g Ca(OH)$_2$ + 7.6 g Ca-acetate + 69.2 g H$_2$O |
| H3 | 292.2 g H$_2$O + 36.5 g Polymer 2 | 35.8 g Na-waterglass + 50.0 g H$_2$O | 8.6 g Ca(OH)$_2$ + 8.0 g Ca-acetate + 69.2 g H$_2$O |
| H4 | 289.4 g H$_2$O + 39.3 g Polymer 2 | 35.8 g Na-waterglass + 50.0 g H$_2$O | 8.6 g Ca(OH)$_2$ + 8.0 g Ca-acetate + 69.2 g H$_2$O |
| H5 | 283.7 g H$_2$O + 44.9 g Polymer 2 | 35.8 g Na-waterglass + 50.0 g H$_2$O | 8.6 g Ca(OH)$_2$ + 8.0 g Ca-acetate + 69.2 g H$_2$O |
| H6 | 283.7 g H$_2$O + 30.3 g Polymer 3 | 35.8 g Na-waterglass + 50.0 g H2O | 12.2 g Ca(OH)$_2$ + 71.4 g H$_2$O |
| H7 | 303.2 g H$_2$O + 25.5 g Polymer 1 | 35.8 g Na-waterglass + 50.0 g H$_2$O | 8.6 g Ca(OH)$_2$ + 7.6 g Ca-acetate + 67.6 g H$_2$O + 1.8 g Polymer 1 |
| H8 | 301.0 g H$_2$O + 27.6 g Polymer 1 | 35.8 g Na-waterglass + 50.0 g H$_2$O | 8.6 g Ca(OH)$_2$ + 7.6 g Ca-acetate + 67.6 g H$_2$O + 1.8 g Polymer 1 |
| H9 | 396.8 g H$_2$O + 31.9 g Polymer 1 | 35.8 g Na-waterglass + 50.0 g H$_2$O | 8.6 g Ca(OH)$_2$ + 7.6 g Ca-acetate + 67.6 g H$_2$O + 1.8 g Polymer 1 |
| H10 | 299.6 g H$_2$O + 29.0 g Polymer 1 | 35.8 g Na-waterglass + 50.0 g H$_2$O | 8.6 g Ca(OH)$_2$ + 6.3 g Ca-formate + 70.8 g H$_2$O |
| H11 | 299.7 g H$_2$O + 27.3 g Polymer 1 | 35.8 g waterglass + 50.0 g H$_2$O | 8.6 g Ca(OH)$_2$ + 7.6 g Ca-acetate + 69.2 g H$_2$O |

Characterization of the Accelerator Suspensions

BRIEF DESCRIPTION OF THE DRAWINGS

The effect of the accelerator suspensions on the hardening of cement (CEM I Milke 52.5 R) was tested by measuring the heat release using heat flow calorimetry. The results are shown in FIG. 1 which shows the influence of different hardening accelerator compositions on the hardening of Portland cement. The heat flow (HF) over time (t) of the pure cement is reflected by line A. H1 shows influence of a reference accelerator whereas H10 and H11 represent in influence of accelerators according to this invention (heat flow calorimetry for suspensions H1, H10, and H11 compared to the pure cement). The suspensions were mixed with the batching water and the obtained suspension was mixed with 20 g of the cement. The water/cement ratio was adjusted to 0.32. The dosage of the accelerating suspension was selected such that always 0.3% by weight of actives was dosed to the cement. An effective acceleration of the hardening (as defined in H. F. W. Taylor (1997): Cement Chemistry, 2. ed., page 212 et seq.) was observed. The results are presented in table 2.

TABLE 2

| Example | Solids content (% by weight) | Dosage suspension/ cement (% by weight) | Acceleration factor | Compressive strength after 6 h (MPa) |
| --- | --- | --- | --- | --- |
| Milke Cem I 52.5 R | | | 1 | Not detectable |
| H1 - reference | 6.3 | 4.8 | 0.71 | Not detectable |
| H2 | 8.9 | 5.1 | 1.69 | 10.5 |
| H3 | 8.6 | 4.9 | 1.46 | 8 |
| H4 | 8.7 | 5.0 | 1.42 | 7.5 |
| H5 | 9.1 | 5.0 | 1.42 | 6.8 |
| H6 | 8.2 | 5.7 | 1.54 | 9.74 |
| H7 | 8.6 | 4.9 | 1.47 | 11.1 |
| H8 | 8.5 | 5.1 | 1.39 | 11.3 |
| H9 | 9.0 | 5.0 | 1.01 | 9.18 |
| H10 | 8.3 | 5.3 | 1.37 | 11.5 |
| H11 | 7.9 | 5.6 | 1.36 | 12.2 |

The invention claimed is:

1. A process for the preparation of a hardening accelerator composition, the process comprising:
reacting, in water, a calcium source selected from the aroup consisting of calcium hydroxide and calcium oxide with a water-soluble silicate compound in the presence of at least one water-soluble polymeric dispersing agent,
wherein the at least one water-soluble dispersing agent comprises an anionic group and/or an anionoaenic group, and further comprises a polyether side chain, and
wherein the water-soluble silicate compound is of a formula m SiO$_2$.n M$_2$O; M is selected from the group consisting of Li, Na, K and NH$_4$; m and n are molar numbers; and a ratio of m:n is from 2.5 to 4.

2. The process according to claim 1, wherein the calcium source and the water-soluble silicate compound are added to an aqueous solution of the water-soluble polymeric dispersing agent.

3. The process according to claim 1, wherein:
i) the calcium source is present in an amount of from 0,01 to 75% by weight of calcium hydroxide or calcium oxide;
ii) the water-soluble silicate compound is present in an amount of from 0.01 to 75% by weight;
iii) the water-soluble dispersing agent is present in an amount of from 0.001 to 60% by weight; and
iv) the water is present in an amount of from 24 to 99% by weight of water.

4. The process according to claim 1, wherein ratio of m:n is from 2.5 to 3.8.

5. The process according to claim 1, wherein the water-soluble silicate compound is used in powder form.

6. The process according to claim 1, wherein the dispersing agent is a copolymer which includes at least one structural unit having a formula selected from the group consisting of formulas (Ia), (Ib), (Ic), and (Id):

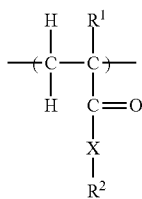
(Ia)

wherein $R^1$ is H or branched or unbranched $C_1$-$C_4$ alkyl, $CH_2COOH$ or $CH_2CO$—X—$R^3$; X is NH—$(C_nH_{2n})$ or O—$(C_nH_{2n})$ wherein n is 1, 2, 3 or 4, wherein the nitrogen atom or the oxygen atom is bound to the CO group, or X is a chemical bond;
$R^2$ is OM, $PO_3M_2$, or O—$PO_3M_2$; with the proviso that X is a chemical bond, if $R^2$ is OM;
$R^3$ is $PO_3M_2$, or O—$PO_3M_2$;

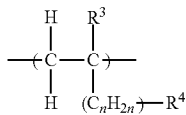
(Ib)

wherein $R^3$ is H or branched or unbranched $C_1$-$C_4$ alky;
n is 0, 1, 2, 3 and 4;
$R^4$ is $PO_3M_2$, or O—$PO_3M_2$;

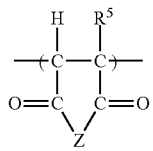
(Ic)

wherein $R^5$ is H or branched or unbranched $C_1$-$C_4$ alkyl;
Z is O or $NR^7$;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$;
n is 1, 2, 3 or 4; and

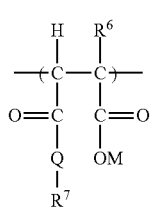
(Id)

wherein $R^6$ is H or branched or unbranched $C_1$-$C_4$ alkyl;
Q is O or $NR^7$;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$;
n is 1, 2, 3 or 4; and
wherein each M independently is H or a cation equivalent.

7. The process according to claim 1, wherein the dispersing agent is a copolymer which comprises at least one structural unit of a formula selected from the group consisting of formulas (IIa), (IIb), (IIc), and (IId):

$$\begin{array}{c} R^{10}\ R^{11} \\ | \ \ \ \ | \\ -\!\!-\!\!(\!C\!-\!\!C\!)\!\!-\!\!- \\ | \ \ \ \ | \\ R^{12}\ (C_nH_{2n})\!-\!O\!-\!E\!-\!G\!-\!(AO)_a\!-\!R^{13} \end{array}$$ (IIa)

wherein $R^{10}$, $R^{11}$ and $R^{12}$ are independently of one another, H branched or unbranched $C_1$-$C_4$ alkyl;
E is branched or unbranched $C_1$-$C_6$-alkylene, cyclohexylene, $CH_2$—$C_6H_{10}$, 1,2-phenylene, 1,3-phenylene, or 1,4-phenylene;
G is O, NH or CO—NH, or E and G together form a chemical bond;
A is $C_xH_{2x}$ where x=2, 3, 4, 5 or $CH_2CH(C_6H_5)$;
n is 0, 1, 2, 3, 4 or 5;
a is an integer from 2 to 350;
$R^{13}$ is H, branched or unbranched $C_1$-$C_4$ alkyl, CO—$NH_2$ or $COCH_3$;

$$\begin{array}{c} R^{16}\ R^{17} \\ | \ \ \ \ | \\ -\!\!-\!\!(\!C\!-\!\!C\!)\!\!-\!\!- \\ | \ \ \ \ | \\ R^{18}\ (C_nH_{2n})\!-\!O\!-\!E\!-\!N\!-\!(AO)_a\!-\!R^{19} \\ \ \ \ \ \ \ \ \ \ \ \ \ \ \ \ \ \ \ \ \ \ \ \ \ \ \ \ | \\ \ \ \ \ \ \ \ \ \ \ \ \ \ \ \ \ \ \ \ \ \ \ (LO)_d\!-\!R^{20} \end{array}$$ (IIb)

wherein $R^{16}$, $R^{17}$, and $R^{18}$ are each independently is H or branched or unbranched $C_1$-$C_4$ alkyl;
E is branched or unbranched $C_1$-$C_6$-alkylene, cyclohexylene, $CH_2$—$C_6H_{10}$, 1,2-phenylene, 1,3-phenylene, or 1,4-phenylene;
A is $C_xH_{2x}$ where x is 2, 3, 4, 5 or $CH_2CH(C_6H_5)$;
L is $C_xH_{2x}$ with x=2, 3, 4, 5 or $CH_2$—$CH(C_6H_5)$;
a is an integer from 2 to 350;
d is an integer from 1 to 350;
$R^{19}$ is H or branched or unbranched $C_1$-$C_4$-alkyl;
$R^{20}$ is H or branched or unbranched $C_1$-$C_4$-alkyl; and
n is 0, 1, 2, 3, 4 or 5;

$$\begin{array}{c} R^{21}\ R^{22} \\ | \ \ \ \ | \\ -\!\!-\!\!(\!C\!-\!\!C\!)\!\!-\!\!- \\ | \ \ \ \ | \\ R^{23}\ C\!-\!W\!-\!\![(AO)_a\!-\!R^{24}]_Y \\ \ \ \ \ \ \| \\ \ \ \ \ \ O \end{array}$$ (IIc)

wherein $R^{21}$, $R^{22}$ and $R^{23}$ independently of each other are H or branched or unbranched $C_1$-$C_4$-alkyl;
W is O, $NR^{25}$ or N;
Y is 1, if W is O or $NR^{25}$, and Y is 2, if W is N;
A is $C_xH_{2x}$ with x=2, 3, 4, 5 or $CH_2CH(C_6H_5)$;

a is an integer from 2 to 350;
$R^{24}$ is H or branched or unbranched $C_1$-$C_4$-alkyl;
$R^{25}$ is H or branched or unbranched $C_1$-$C_4$-alkyl; and (IId)

$$\begin{array}{c} R^6 \quad H \\ | \quad | \\ -(C-C)- \\ | \quad | \\ MO-C \quad C-Q-[(AO)_a-R^{24}]_Y \\ \| \quad \| \\ O \quad O \end{array}$$

wherein
$R^6$ is H or branched or unbranched $C_1$-$C_4$-alkyl;
Q is $NR^{10}$, N or O;
Y is 1, if Q is O or $NR^{10}$, and Y is 2, if Q is N;
$R^{10}$ is H or branched or unbranched $C_1$-$C_4$-alkyl;
A is $C_xH_{2x}$ with x is 2, 3, 4, 5 or $CH_2CH(C_6H_5)$; and
a is an integer from 2 to 350.

8. The process according to claim 1, wherein the dispersing agent is a polycondensation product comprising structural units (III) and (IV), wherein:

(III)

$$\begin{array}{c} | \\ T-B-[(AO)_a-R^{25}]_n \\ | \end{array}$$

wherein T is substituted or unsubstituted phenyl or naphthyl or substituted or unsubstituted heteroaryl with 5 to 10 ring atoms, of which 1 or 2 atoms are heteroatoms, which are selected from N, O and S;
n is 1 or 2;
B is N, NH or O, with the proviso that n is 2, if B is N and with the proviso that n is 1, if B is NH or O;
A is $C_xH_{2x}$ with x is 2, 3, 4, 5 or $CH_2CH(C_6H_5)$;
a is an integer from 1 to 300;
$R^{25}$ is H or branched or unbranched $C_1$-$C_{10}$-alkyl, $C_5$-$C_8$-cycloalkyl, aryl, or heteroaryl with 5 to 10 ring atoms, of which 1 or 2 atoms are heteroatoms, which are selected from N, O and S;
wherein structural unit (IV) is selected from structural units (IVa) and (IVb):

(IVa)

$$\begin{array}{c} | \quad \quad \quad O \\ | \quad \quad \quad \| \\ D-E-[(AO)_b-P-OM]_n \\ | \quad \quad \quad | \\ \quad \quad \quad OM \end{array}$$

wherein D is substituted or unsubstituted phenyl or naphthyl or substituted or unsubstituted heteroaryl with 5 to 10 ring atoms, of which 1 or 2 atoms are heteroatoms, which are selected from N, O and S;
E is N, NH or O, with the proviso that n is 2, if E is N and with the proviso that n is 1, if E is NH or O;
A is $C_xH_{2x}$ with x is 2, 3, 4, 5 or $CH_2CH(C_6H_5)$;
b is an integer from 1 to 300;
M is independently H or a cation equivalent;

(IVb)

$$\begin{array}{c} | \\ V-R^7 \\ | \end{array}$$

wherein V is substituted or unsubstituted phenyl or naphthyl which is optionally substituted by one or two groups selected from $R^8$, OH, $OR^8$, $(CO)R^8$, COOM, $COOR^8$, $SO_3R^8$ and $NO_2$;
$R^7$ is COOM, $OCH_2COOM$, $SO_3M$ or $OPO_3M_2$;
M is H or a cation equivalent; and
$R^8$ is $C_1$-$C_4$-alkyl, phenyl, naphthyl, phenyl-$C_1$-$C_4$-alkyl or $C_1$-$C_4$-alkylphenyl.

9. The process according to claim 8, wherein the polycondensation product comprises a further structural unit (V) of the formula (V)

$$\begin{array}{c} \diagdown \diagup \\ \diagup \diagdown \\ R^5 \quad \quad R^6 \end{array}$$

wherein $R^5$ and $R^6$ are the same or different and are H, $CH_3$, COOH or substituted or unsubstituted phenyl or naphthyl or substituted or unsubstituted heteroaryl with 5 to 10 ring atoms, of which 1 or 2 atoms are heteroatoms selected from N, O and S.

10. The process according to claim 1, further comprising a subsequent step of drying the hardening accelerator composition.

11. A hardening accelerator composition obtained by the process according to claim 1.

12. A building material mixture comprising a hardening accelerator composition according to claim 11 and a building material component selected from the group consisting of cement, gypsum, anhydrite, slag, fly ash, silica dust, metakaolin, natural pozzolans, calcined oil shale, calcium sulfoaluminate cement and calcium aluminate cement.

13. A process comprising preparing the building material mixture of claim 12 by admixing the hardening accelerator composition with the building material component to form the building material mixture.

* * * * *